(12) United States Patent
Chen et al.

(10) Patent No.: US 11,597,594 B2
(45) Date of Patent: Mar. 7, 2023

(54) LAWN REFUSE BAG INSERT

(71) Applicant: Pratt Corrugated Holdings, Inc., Brookhaven, GA (US)

(72) Inventors: Shifeng Chen, Newport News, VA (US); Greg Sollie, Sharpsburg, GA (US); Jamie Waltermire, Peachtree City, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 254 days.

(21) Appl. No.: 16/703,184

(22) Filed: Dec. 4, 2019

(65) Prior Publication Data

US 2021/0070542 A1    Mar. 11, 2021

Related U.S. Application Data

(60) Provisional application No. 62/896,935, filed on Sep. 6, 2019.

(51) Int. Cl.
| | |
|---|---|
| *B65F 1/14* | (2006.01) |
| *B65F 1/16* | (2006.01) |
| *B65D 33/12* | (2006.01) |
| *B65F 1/00* | (2006.01) |
| *B65B 51/04* | (2006.01) |
| *B65D 33/16* | (2006.01) |

(Continued)

(52) U.S. Cl.
CPC .............. *B65F 1/1415* (2013.01); *B65F 1/14* (2013.01); *B65B 3/04* (2013.01); *B65B 51/04* (2013.01); *B65D 33/06* (2013.01); *B65D 33/12* (2013.01); *B65D 33/1608* (2013.01); *B65F 1/002* (2013.01); *B65F 2001/1653* (2013.01); *B65F 2220/106* (2013.01); *B65F 2220/1063* (2013.01); *B65F 2240/138* (2013.01)

(58) Field of Classification Search
USPC ..... 383/127, 4, 33, 34, 34.1; 248/95, 97, 99, 248/100, 101
See application file for complete search history.

(56) References Cited

U.S. PATENT DOCUMENTS

| | | |
|---|---|---|
| 474,382 A | 5/1892 | Haines |
| 645,544 A | 3/1900 | Bissell |

(Continued)

FOREIGN PATENT DOCUMENTS

| | | |
|---|---|---|
| DE | 202013007170 | 11/2013 |
| FR | 2687641 | 8/1993 |
| JP | 2004024200 | 1/2004 |

OTHER PUBLICATIONS

Chen, Shifeng; Corrected Notice of Allowance for Design U.S. Appl. No. 29/715,749, filed Dec. 4, 2019, dated Jun. 8, 2021, 6 pgs.

(Continued)

*Primary Examiner* — Alfred J Wujciak
(74) *Attorney, Agent, or Firm* — Taylor English Duma LLP

(57) ABSTRACT

Example aspects of a lawn refuse bag insert, a lawn refuse disposal assembly, and method for using a lawn refuse disposal assembly are disclosed. The lawn refuse bag insert can comprise a bag stand defining a top stand end and a bottom stand end and comprising an end wall and a first side wall, the first side wall hingedly coupled to the end wall; and a first rake detachably coupled to the bag stand, wherein the lawn refuse bag insert is formed as a blank.

12 Claims, 13 Drawing Sheets

(51) Int. Cl.
B65D 33/06 (2006.01)
B65B 3/04 (2006.01)

(56) References Cited

U.S. PATENT DOCUMENTS

| | | | |
|---|---|---|---|
| 672,657 A | 4/1901 | Vautrot | |
| 1,088,633 A | 2/1914 | Simmons | |
| 1,234,057 A | 7/1917 | McIntyre | |
| 1,571,608 A | 2/1926 | Stillman | |
| 1,846,542 A | 2/1932 | Budd | |
| 1,858,793 A | 5/1932 | Archibald | |
| 1,879,410 A | 9/1932 | Morris et al. | |
| 1,879,950 A | 9/1932 | Read, Jr. | |
| 1,898,838 A | 2/1933 | Katz | |
| 1,916,519 A | 7/1933 | Madsen | |
| 1,986,898 A | 1/1935 | Smithwick | |
| 2,307,659 A | 1/1943 | Avery | |
| 2,430,155 A | 11/1947 | Buttery | |
| 2,550,959 A | 5/1951 | Bowman | |
| 2,939,614 A | 6/1960 | Hill | |
| 3,021,767 A | 2/1962 | Hamilton | |
| 3,257,068 A | 6/1966 | Wright | |
| 3,324,906 A | 6/1967 | Chu | |
| 3,335,769 A | 8/1967 | Ilg | |
| 3,578,236 A | 5/1971 | Masayuki | |
| 3,734,340 A | 5/1973 | Ippolito et al. | |
| 3,746,240 A | 7/1973 | Flynn | |
| 3,891,136 A | 6/1975 | Woeste | |
| 3,938,731 A | 2/1976 | Ross et al. | |
| 3,977,594 A | 8/1976 | Swan | |
| 3,983,914 A | 10/1976 | Benson | |
| 3,986,744 A * | 10/1976 | Krogstad | E01H 1/1206 294/1.3 |
| 4,037,778 A | 7/1977 | Boyle | |
| 4,115,909 A | 9/1978 | Corella | |
| 4,139,029 A | 2/1979 | Geraci | |
| 4,196,928 A * | 4/1980 | Spangler | A01D 51/00 15/104.8 |
| 4,258,842 A | 3/1981 | Falkstein | |
| 4,268,081 A | 5/1981 | Hawkinson | |
| 4,272,116 A * | 6/1981 | Tufte, Jr. | E01H 1/1206 294/1.3 |
| 4,273,167 A | 6/1981 | Stillwell | |
| 4,338,979 A | 7/1982 | Dow | |
| 4,361,267 A | 11/1982 | Wozniacki | |
| 4,366,916 A | 1/1983 | Guido et al. | |
| 4,386,729 A | 6/1983 | Schmidt | |
| 4,457,483 A | 7/1984 | Gagne | |
| 4,530,533 A | 7/1985 | Dieter | |
| 4,628,007 A | 12/1986 | Ledsham | |
| 4,643,380 A | 2/1987 | Copeland | |
| 4,659,045 A | 4/1987 | Flynn | |
| 4,669,689 A | 6/1987 | Jones | |
| 4,697,771 A | 10/1987 | Majors | |
| 4,749,011 A | 6/1988 | Rylander | |
| 4,760,982 A | 8/1988 | Cooke | |
| 4,836,970 A | 6/1989 | Robbins, III | |
| 4,884,603 A | 12/1989 | Simpson | |
| 4,890,652 A | 1/1990 | Hoerner | |
| 4,895,456 A | 1/1990 | Morita | |
| 4,909,553 A | 3/1990 | Hantover | |
| 4,940,200 A | 7/1990 | Sawyer | |
| 4,955,496 A | 9/1990 | Nelson | |
| 4,979,547 A | 12/1990 | Hoerner | |
| 5,018,637 A | 5/1991 | Miller | |
| 5,033,780 A | 7/1991 | Wootten | |
| 5,048,778 A | 9/1991 | Wright | |
| 5,054,724 A | 10/1991 | Hutcheson | |
| 5,056,679 A | 10/1991 | Lonczak | |
| 5,065,965 A | 11/1991 | Aulabaugh | |
| 5,080,308 A | 1/1992 | Franks | |
| 5,090,756 A | 2/1992 | Pfisterer | |
| 5,129,609 A | 7/1992 | Tobin | |
| 5,186,384 A * | 2/1993 | Nelson | E01H 1/1206 294/1.3 |
| 5,271,589 A | 12/1993 | Belous | |
| 5,285,988 A | 2/1994 | Bogren | |
| 5,292,093 A | 3/1994 | Shumake | |
| 5,316,060 A | 5/1994 | Hogdon et al. | |
| 5,372,269 A | 12/1994 | Sutton et al. | |
| 5,400,989 A | 3/1995 | Gaskill | |
| D361,185 S | 8/1995 | Seiler et al. | |
| 5,593,117 A | 1/1997 | Alexander | |
| 5,610,230 A | 3/1997 | Yoshida et al. | |
| 5,716,033 A | 2/1998 | Gibson | |
| D391,722 S | 3/1998 | Sheppard | |
| 5,765,614 A | 6/1998 | Kardosh | |
| 5,816,431 A | 10/1998 | Giannopoulos | |
| 5,865,486 A * | 2/1999 | Bussani | E01H 1/1206 294/1.3 |
| 5,868,364 A | 2/1999 | Macmillan | |
| 5,871,037 A | 2/1999 | Feldt | |
| 5,897,084 A | 4/1999 | Judge | |
| 5,915,768 A | 6/1999 | Young | |
| 5,918,651 A | 7/1999 | Gazdy et al. | |
| 5,979,842 A | 11/1999 | Fan | |
| 6,007,030 A | 12/1999 | Judge | |
| 6,035,908 A | 3/2000 | Hoffman | |
| 6,045,263 A | 4/2000 | Keller et al. | |
| 6,073,943 A | 6/2000 | Serrault | |
| 6,085,647 A | 7/2000 | Burow | |
| 6,116,548 A | 9/2000 | Oleson | |
| 6,116,549 A | 9/2000 | Santa Cruz et al. | |
| 6,131,759 A | 10/2000 | Young | |
| 6,135,518 A | 10/2000 | Holthaus | |
| 6,179,306 B1 * | 1/2001 | Maxwell | B62B 1/26 280/43.1 |
| 6,189,841 B1 | 2/2001 | Lapoint et al. | |
| 6,202,718 B1 | 3/2001 | Innocenti | |
| 6,273,156 B1 | 8/2001 | Carillo | |
| 6,296,212 B1 | 10/2001 | Monahan | |
| 6,340,037 B1 | 1/2002 | Stafford | |
| 6,367,747 B1 | 4/2002 | Mulle | |
| 6,415,713 B1 | 7/2002 | Abrams | |
| 6,431,435 B1 | 8/2002 | Jones et al. | |
| 6,450,461 B1 | 9/2002 | Lohmann | |
| 6,481,617 B2 | 11/2002 | Yang | |
| 6,536,488 B1 | 3/2003 | Pochobradsky | |
| 6,554,810 B1 | 4/2003 | Wilk et al. | |
| 6,659,407 B2 | 12/2003 | Asaro | |
| D485,166 S | 1/2004 | Clark | |
| 6,708,742 B2 | 3/2004 | Weathers et al. | |
| D494,853 S | 8/2004 | Chan | |
| D498,667 S | 11/2004 | Clark | |
| D500,457 S | 1/2005 | Peeples et al. | |
| D502,582 S | 3/2005 | Boles | |
| 6,860,094 B1 | 3/2005 | Abrams | |
| 6,866,070 B2 | 3/2005 | King | |
| 6,896,015 B2 | 5/2005 | Beveridge | |
| D513,352 S | 12/2005 | Weathers et al. | |
| 6,983,965 B1 | 1/2006 | Bergell | |
| 7,066,220 B1 | 6/2006 | Take et al. | |
| 7,066,379 B2 | 6/2006 | Mcleod et al. | |
| 7,152,894 B2 | 12/2006 | Weathers et al. | |
| 7,159,761 B2 | 1/2007 | Abshire et al. | |
| 7,246,641 B2 | 7/2007 | Blessman | |
| 7,302,978 B1 | 12/2007 | Kolarik | |
| D567,464 S | 4/2008 | Dullum | |
| 7,367,600 B1 | 5/2008 | Lew et al. | |
| 7,398,913 B2 | 7/2008 | Mcclure | |
| 7,407,139 B1 | 8/2008 | Dolan | |
| D576,500 S | 9/2008 | Kim et al. | |
| D578,409 S | 10/2008 | Clark | |
| 7,434,721 B2 | 10/2008 | Feltz | |
| 7,494,096 B2 | 2/2009 | Paloian et al. | |
| D593,721 S | 6/2009 | Koll | |
| 7,604,156 B2 | 10/2009 | Clohessy | |
| 7,625,026 B2 * | 12/2009 | Lau | E01H 1/1206 294/1.3 |
| 7,651,024 B2 | 1/2010 | Barner | |
| 7,694,838 B2 | 4/2010 | Yang | |
| 7,712,623 B2 | 5/2010 | Wentz et al. | |
| 7,736,057 B2 | 6/2010 | Vanbost | |
| 7,810,766 B2 | 10/2010 | Blessman | |

(56) References Cited

U.S. PATENT DOCUMENTS

| | | | |
|---|---|---|---|
| 7,815,153 | B2 | 10/2010 | Campbell et al. |
| D633,268 | S | 2/2011 | Bottita |
| D639,519 | S | 6/2011 | Gomez |
| 3,020,686 | A1 | 9/2011 | Babineau et al. |
| D648,912 | S | 11/2011 | Cantu |
| D699,014 | S | 2/2014 | Lohrke et al. |
| 8,757,563 | B2 | 6/2014 | Muse |
| 8,840,072 | B2 | 9/2014 | Muse |
| 8,978,964 | B1 | 3/2015 | Ruggiere, Sr. |
| 9,056,715 | B2 | 6/2015 | Muse |
| 9,102,432 | B2 | 8/2015 | Muse |
| D738,743 | S | 9/2015 | Galmarini |
| 9,352,870 | B2 | 5/2016 | Muse |
| 9,517,884 | B2 | 12/2016 | Muse |
| 9,550,623 | B2 | 1/2017 | Muse |
| D785,463 | S | 5/2017 | Akana et al. |
| 9,701,470 | B2 | 7/2017 | Muse |
| 9,896,266 | B2 | 2/2018 | Muse |
| D860,000 | S | 9/2019 | Baldelomar Bernardin |
| D899,723 | S | 10/2020 | Boyea |
| D900,629 | S | 11/2020 | Milos |
| D909,211 | S | 2/2021 | Bornmiller et al. |
| D919,432 | S | 5/2021 | Muse et al. |
| D929,238 | S | 8/2021 | Chen et al. |
| D935,124 | S | 11/2021 | Chen et al. |
| D941,677 | S | 1/2022 | Chen et al. |
| D956,494 | S | 7/2022 | Chen et al. |
| D957,081 | S | 7/2022 | Chen et al. |
| 2002/0074247 | A1 | 6/2002 | Tremblay |
| 2002/0130224 | A1 | 9/2002 | Asaro |
| 2003/0173471 | A1 | 9/2003 | Weathers et al. |
| 2003/0218104 | A1 | 11/2003 | Klotz |
| 2006/0011785 | A1 | 1/2006 | Mclean |
| 2006/0032991 | A1 | 2/2006 | Gaines |
| 2006/0144467 | A1 | 7/2006 | Butzer |
| 2006/0273143 | A1 | 12/2006 | Finch |
| 2008/0023595 | A1 | 1/2008 | Armaly, Jr. |
| 2008/0128479 | A1 | 6/2008 | Bates et al. |
| 2010/0108826 | A1 | 5/2010 | Fernandez et al. |
| 2010/0142860 | A1 | 6/2010 | Mincozzi |
| 2010/0237202 | A1 | 9/2010 | Mincozzi |
| 2010/0243650 | A1 | 9/2010 | Manley |
| 2010/0276247 | A1 | 11/2010 | Babineau et al. |
| 2011/0011921 | A1 | 1/2011 | Sorensen |
| 2011/0309208 | A1 | 12/2011 | Muse |
| 2011/0309209 | A1 | 12/2011 | Muse |
| 2011/0309210 | A1 | 12/2011 | Muse |
| 2012/0110959 | A1 | 5/2012 | Serago, Jr. |
| 2013/0019995 | A1 | 1/2013 | Muse |
| 2013/0020449 | A1 | 1/2013 | Muse |
| 2013/0092726 | A1* | 4/2013 | McMahon ........ B29C 66/81425 229/126 |
| 2013/0140308 | A1 | 6/2013 | Stowers |
| 2013/0156350 | A1 | 6/2013 | Turner |
| 2014/0331616 | A1 | 11/2014 | Muse |
| 2014/0339379 | A1 | 11/2014 | Muse |
| 2015/0232222 | A1 | 8/2015 | Muse |
| 2015/0291354 | A1 | 10/2015 | Muse |
| 2016/0001975 | A1 | 1/2016 | Muse |
| 2016/0236864 | A1 | 8/2016 | Muse |
| 2017/0088350 | A1 | 3/2017 | Muse |
| 2017/0275095 | A1 | 9/2017 | Muse |
| 2021/0070541 | A1 | 3/2021 | Chen et al. |

OTHER PUBLICATIONS

Chen, Shifeng; Corrected Notice of Allowance for Design U.S. Appl. No. 29/715,749, filed Dec. 4, 2019, dated Jul. 26, 2021, 6 pgs.
Chen, Shifeng; Notice of Allowance for Design U.S. Appl. No. 29/175,742, filed Dec. 4, 2019, dated Jun. 29, 2021, 42 pgs.
Chen, Shifeng; Non-Final Office Action for U.S. Appl. No. 16/703,272, filed Dec. 4, 2019, dated Sep. 17, 2021, 49 pgs.
Chen, Shifeng; Corrected Notice of Allowance for U.S. Appl. No. 29/800,663, filed Jul. 22, 2021, dated Oct. 18, 2021, 34 pgs.
Chen, Shifeng; Notice of Allowance for U.S. Appl. No. 29/800,663, filed Jul. 22, 2021, dated Oct. 4, 2021, 6 pgs.
Chen, Shifeng; Corrected Notice of Allowance for Design U.S. Appl. No. 29/715,742, filed Dec. 4, 2019, dated Oct. 4, 2021, 6 pgs.
Chen, Shifeng; Corrected Notice of Allowance for U.S. Appl. No. 29/715,742, filed Dec. 4, 2019, dated Aug. 31, 2021, 6 pgs.
Muse, John Richard; Applicant Initiated Interview Summary for U.S. Appl. No. 13/164,464, filed Jun. 20, 2011, dated Mar. 11, 2014, 5 pgs.
Muse, John Richard; Final Office Action for U.S. Appl. No. 13/164,464, filed Jun. 20, 2011, dated Jan. 10, 2014, 8 pgs.
Muse, John Richard; Final Office Action for U.S. Appl. No. 13/164,464, filed Jun. 20, 2011, dated Sep. 23, 2013, 8 pgs.
Muse, John Richard; Final Office Action for U.S. Appl. No. 13/164,464, filed Jun. 20, 2011; dated Feb. 22, 2013, 6 pgs.
Muse, John Richard; Issue Notification for U.S. Appl. No. 13/164,464, filed Jun. 20, 2011, mailed Sep. 3, 2014, 1 pg.
Muse, John Richard; Non-Final Office Action for U.S. Appl. No. 13/164,464, filed Jun. 20, 2011, dated May 29, 2013, 12 pgs.
Muse, John Richard; Non-Final Office Action for U.S. Appl. No. 13/164,464, filed Jun. 20, 2011; dated Nov. 16, 2012, 17 pgs.
Muse, John Richard; Notice of Allowance for U.S. Appl. No. 13/164,464, filed Jun. 20, 2011, dated Apr. 29, 2014, 11 pgs.
Muse, John Richard; Restriction Requirement for U.S. Appl. No. 13/164,464, filed Jun. 20, 2011, dated Oct. 19, 2012; 6 pgs.
Muse, John Richard; Non-Final Office Action for U.S. Appl. No. 14/447,043, filed Jul. 30, 2014, dated Mar. 31, 2015, 32 pgs.
Muse, John Richard; Notice of Allowance for U.S. Appl. No. 14/447,043, filed Jul. 30, 2014, dated Jul. 23, 2015, 12 pgs.
Muse, John Richard; Corrected Notice of Allowability for U.S. Appl. No. 14/447,058, filed Jul. 30, 2014, dated Jul. 8, 2015, 4 pgs.
Muse, John Richard; Issue Notification for U.S. Appl. No. 14/447,058, filed Jul. 30, 2014, mailed Jul. 22, 2015, 1 pg.
Muse, John Richard; Notice of Allowance for U.S. Appl. No. 14/447,058, filed Jul. 30, 2014, dated Mar. 30, 2015, 34 pgs.
Muse, John Richard; Non-Final Office Action for U.S. Appl. No. 14/748,772, filed Jun. 24, 2015, dated Oct. 2, 2015, 30 pgs.
Muse, John Richard; Applicant Initiated Interview Summary for U.S. Appl. No. 13/164,473, filed Jun. 20, 2011, dated Dec. 2, 2013, 3 pgs.
Muse, John Richard; Final Office Action for U.S. Appl. No. 13/164,473, filed Jun. 20, 2011, dated Dec. 13, 2013, 28 pgs.
Muse, John Richard; Issue Notification for U.S. Appl. No. 13/164,473, filed Jun. 20, 2011, dated Jun. 4, 2014, 1 pg.
Muse, John Richard; Notice of Allowance for U.S. Appl. No. 13/164,473, filed Jun. 20, 2011, dated Mar. 13, 2014, 12 pgs.
Muse, John Richard; Supplemental Notice of Allowability for U.S. Appl. No. 13/164,473, filed Jun. 20, 2011, dated May 27, 2014, 6 pgs.
Muse, John; Final Office Action for U.S. Appl. No. 13/164,473, filed Jun. 20, 2011, dated Mar. 13, 2013, 16 pgs.
Muse; Non-Final Office Action for U.S. Appl. No. 13/164,473, filed Jun. 20, 2011, dated Dec. 3, 2012; 19 pgs.
Muse; Non-Final Office Action for U.S. Appl. No. 13/164,473, filed Jun. 20, 2011, dated Jun. 25, 2013, 14 pgs.
Muse, John Richard; Final Office Action for U.S. Appl. No. 13/164,481, filed Jun. 20, 2011, dated Apr. 5, 2013, 17 pgs.
Muse, John Richard; Non-Final Office Action for U.S. Appl. No. 13/164,481, filed Jun. 20, 2011, dated Dec. 5, 2012; 18 pgs.
Muse, John Richard; Notice of Allowance for U.S. Appl. No. 13/164,481, filed Jun. 20, 2011, dated Oct. 23, 2013, 11 pgs.
Muse; Non-Final Office Action for U.S. Appl. No. 13/164,481, filed Jun. 20, 2011, dated Jul. 11, 2013, 11 pgs.
Muse, John Richard; Advisory Action for U.S. Appl. No. 13/551,575, filed Jul. 17, 2012, dated Dec. 4, 2014, 3 pgs.
Muse, John Richard; Applicant-Initiated Interview Summary for U.S. Appl. No. 13/551,575, filed Jul. 17, 2012, dated Dec. 19, 2014, 3 pgs.
Muse, John Richard; Final Office Action for U.S. Appl. No. 13/551,575, filed Jul. 17, 2012, dated Sep. 30, 2014, 22 pgs.
Muse, John Richard; Issue Notification for U.S. Appl. No. 13/551,575, filed Jul. 17, 2012, mailed May 27, 2015, 1 pg.

(56) References Cited

OTHER PUBLICATIONS

Muse, John Richard; Non-Final Office Action for U.S. Appl. No. 13/551,575, filed Jul. 17, 2012, dated Dec. 6, 2013, 45 pgs.
Muse, John Richard; Non-Final Office Action for U.S. Appl. No. 13/551,575, filed Jul. 17, 2012, dated May 16, 2014, 12 pgs.
Muse, John Richard; Notice of Allowance for U.S. Appl. No. 13/551,575, filed Jul. 17, 2012, dated Feb. 2, 2015, 12 pgs.
Muse, John Richard; Advisory Action for U.S. Appl. No. 14/701,022, filed Apr. 30, 2015, dated Jan. 21, 2016, 4 pgs.
Muse, John Richard; Applicant Interview Summary for U.S. Appl. No. 14/701,022, filed Apr. 30, 2015, dated Dec. 22, 2015, 3 pgs.
Muse, John Richard; Final Office Action for U.S. Appl. No. 14/701,022, filed Apr. 30, 2015, dated Oct. 22, 2015, 27 pgs.
Muse, John Richard; Issue Notification for U.S. Appl. No. 14/701,022, filed Apr. 30, 2015, mailed May 11, 2016, 1 pg.
Muse, John Richard; Non-Final Office Action for U.S. Appl. No. 14/701,022, filed Apr. 30, 2015, dated Jun. 3, 2015, 12 pgs.
Muse, John Richard; Notice of Allowance for U.S. Appl. No. 14/701,022, filed Apr. 30, 2015, dated Feb. 8, 2016, 12 pgs.
Muse, John Richard; Issue Notification for U.S. Appl. No. 15/139,375, filed Apr. 27, 2016, mailed Jan. 4, 2017; 1 pg.
Muse, John Richard; Notice of Allowance for U.S. Appl. No. 15/139,375, filed Apr. 27, 2016; dated Sep. 28, 2016; 35 pgs.
Muse, John, R.; Applicant Initiated Interview Summary for U.S. Appl. No. 15/139,375, filed Apr. 27, 2016, dated Jun. 6, 2016, 3 pgs.
Muse, John Richard; Issue Notification for U.S. Appl. No. 15/373,103, filed Dec. 8, 2016, mailed Jun. 21, 2017; 1 page.
Muse, John Richard; Non-final Office Action for U.S. Appl. No. 15/373,103, filed Dec. 8, 2016, dated Feb. 7, 2017; 9 pgs.
Muse, John Richard; Notice of Allowance for U.S. Appl. No. 15/373,103, filed Dec. 8, 2016, dated Mar. 16, 2017; 6 pgs.
Muse, John Richard, Notice of Allowance for U.S. Appl. No. 14/854,777, filed Sep. 15, 2015, dated Sep. 19, 2016, 10 pgs.
Muse, John Richard; Advisory Action for U.S. Appl. No. 14/854,777, filed Sep. 15, 2015, dated Jul. 25, 2016, 3 pgs.
Muse, John Richard; Applicant Initiated Interview Summary for U.S. Appl. No. 14/854,777, filed Sep. 15, 2015, dated Jun. 16, 2016, 3 pgs.
Muse, John Richard; Applicant-Initiated Interview Summary for U.S. Appl. No. 14/854,777, filed Sep. 15, 2015, dated Aug. 26, 2016; 3 pgs.
Muse, John Richard; Issue Notification for U.S. Appl. No. 14/854,777, filed Sep. 15, 2015, mailed Nov. 22, 2016; 1 pg.
Muse, John Richard; Final Office Action for U.S. Appl. No. 14/854,777, filed Sep. 15, 2015, dated May 24, 2016, 12 pgs.
Muse, John Richard; Non-Final Office Action for U.S. Appl. No. 14/854,777, filed Sep. 15, 2015, dated Dec. 22, 2015, 38 pgs.
Muse, John Richard; Issue Notification for U.S. Appl. No. 15/615,895, filed Jun. 7, 2017, mailed Jan. 31, 2018, 1 pg.
Muse, John Richard; Notice of Allowance for U.S. Appl. No. 15/615,895, filed Jun. 7, 2017, dated Dec. 8, 2017, 13 pgs.
Muse; Non-Final Office Action U.S. Appl. No. 15/615,895, filed Jun. 7, 2017, dated Sep. 14, 2017; 38 pgs.
Muse, John Richard; Supplemental Notice of Allowability for U.S. Appl. No. 13/551,583, filed Jul. 17, 2012, dated Oct. 15, 2015, 5 pgs.
Muse, John Richard; Notice of Allowance for U.S. Appl. No. 13/551,583, filed Jul. 17, 2012, dated Sep. 28, 2015, 13 pgs.
Muse, John Richard; Non-Final Office Action for U.S. Appl. No. 13/551,583, filed Jul. 17, 2012, dated Apr. 1, 2015, 12 pgs.
Muse, John Richard; Final Office Action for U.S. Appl. No. 13/551,583, filed Jul. 17, 2012, dated Dec. 31, 2014, 16 pgs.
The Home Depot; Article entitled: "Leaf Easy Plastic Leaf and Lawn Chute", publicly available prior to Aug. 19, 2019, 3 pgs.
Muse, John Richard; Non-Final Office Action for U.S. Appl. No. 13/551,583, filed Jul. 17, 2012, dated Jul. 15, 2014, 38 pgs.
KNOWLEDGEBOARD.CO; Article entitled: "Leaf Bag Holder", Apr. 21, 2019, 23 pgs.
DONTHUNTMENOW.CLUB; Article entitled: "Paper Leaf Bag", Dec. 1, 2018, 23 pgs.
ALIBABA.COM; Article entitled: "Heavy Duty 32 Gallon Reusable Collapsible Yard Waste Container", publicly available prior to Aug. 19, 2019, 4 pgs.
Chen, Shifeng; Notice of Allowance for Design U.S. Appl. No. 29/715,749, filed Dec. 4, 2019, dated Apr. 21, 2021, 36 pgs.
Chen, Shifeng; Final Office Action for U.S. Appl. No. 16/703,272, filed Dec. 4, 2019, dated Feb. 18, 2022, 14 pgs.
Chen, Shifeng; Notice of Allowance for Design U.S. Appl. No. 29/809,463, filed Sep. 28, 2021, dated Feb. 24, 2022, 40 pgs.
Chen, Shifeng; Notice of Allowance for Design U.S. Appl. No. 29/809,466, filed Sep. 28, 2021, dated Feb. 24, 2022, 39 pgs.
Google search Feb. 17, 2022, ebay.com, Jardineer garden leaf scoops yard, leaf grabber claws, https://www.ebay.com/tm/14441117 4223 (Year: 2022), 4 pgs.
Chen, Shifeng; Non-Final Office Action for U.S. Appl. No. 16/703,272, filed Dec. 4, 2019, dated May 20, 2022, 19 pgs.
Chen, Shifeng; Final Office Action for U.S. Appl. No. 16/703,272, filed Dec. 4, 2019, dated Oct. 28, 2022, 19 pgs.
Chen, Shifeng; Notice of Allowance for U.S. Appl. No. 29/840,177, filed May 26, 2022, dated Jan. 24, 2023, 52 pgs.
lowes.com retrieved Jan. 9, 2022, leafeasy46.75 inX15 in bag insert, https://www.lowes.com/pd/LeafEasy-46-in-x-16-75-n-Trash-Bag-Insert/50049703 (Year: 2022), 5 pgs.
Lowes.com retrieved on Jan. 9, 2022, leafEasy 39 gallon outdoor plastic lawn and leaf trash bag, https://www.lowes.com/pd/LeafEasy-39-Gallon-Green-Plastic-Lawn-and-Leaf-Trash-Bag/1001315000 (Year: 2022), 5 pgs.
Chen, Shifeng; Notice of Allowance for U.S. Appl. No. 29/840,178, filed May 26, 2022, dated Jan. 25, 2023, 52 pgs.
Google search Jan. 9, 2023, ebay.com, Jardineer garden leaf scoops yard, leaf grabber claws, https://www.ebay.com/tm/364100256621 (Year: 2022), 4 pgs.

* cited by examiner

LAWN REFUSE BAG INSERT

CROSS-REFERENCE TO RELATED APPLICATIONS

The present application claims priority to U.S. Provisional Application No. 62/896,935, filed Sep. 6, 2019, which is hereby specifically incorporated by reference herein in its entirety.

TECHNICAL FIELD

This disclosure relates to lawn refuse disposal. More specifically, this disclosure relates to a lawn refuse bag insert for holding open a lawn refuse bag.

BACKGROUND

Lawn refuse (e.g., leaves, grass clippings, dirt, sticks, etc.) is typically bagged for removal from a lawn. Lawn refuse bags define a cavity for receiving lawn refuse, and are often formed from a flexible material, such as paper or plastic, and are discarded along with the lawn refuse. However, flexible refuse bags can be prone to collapsing or tipping over, and can therefore be difficult to fill. Furthermore, a user's hands are typically occupied with carrying and dumping the lawn refuse in the cavity of the refuse bag, and cannot be used to provide needed support to the refuse bag.

Typically, closing the refuse bag after filling the refuse bag requires folding and rolling a top end of the refuse bag. As such, a sufficient amount of space must be left within the cavity at the top end of the refuse bag to facilitate closing the top end of the bag. A user must be aware of how much lawn refuse is in the refuse bag and take care not to fill the refuse bag too fully. In instances where the refuse bag is too full to close the top end, lawn refuse must be removed from the refuse bag to allow for proper closure.

A rake can be used to facilitate gathering lawn refuse and lifting the refuse into the refuse bag. Rakes typically comprise a long handle and are operated with two hands. Some users may not own a rake for facilitating the disposal of lawn refuse. Other users who do own a rake must use both hands to navigate the long-handled rake when lifting the refuse from the yard and dumping it into the refuse bag.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a lawn refuse bag insert comprising a bag stand defining a top stand end and a bottom stand end and comprising an end wall and a first side wall, the first side wall hingedly coupled to the end wall; and a first rake detachably coupled to the bag stand, wherein the lawn refuse bag insert is formed as a blank.

A lawn refuse disposal assembly is also disclosed, the lawn refuse disposal assembly comprising a lawn refuse bag comprising a bag body defining a top end, a first handle assembly coupled to the bag body at the top end, and a second handle assembly coupled to the bag body at the top end; and a lawn refuse bag insert comprising a bag stand and a rake detachably coupled to the bag stand, the bag stand configured to engage an interior cavity of the lawn refuse bag.

Also disclosed is a method for using a lawn refuse disposal assembly comprising providing a lawn refuse bag insert comprising a bag stand and a rake, the bag stand comprising an end wall and a side wall; detaching the rake from the bag stand; engaging the bag stand with a lawn refuse bag; shifting lawn refuse with the rake into the lawn refuse bag; disengaging the bag stand from the lawn refuse bag; and tying a first handle assembly of the lawn refuse bag with a second handle assembly of the lawn refuse bag.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
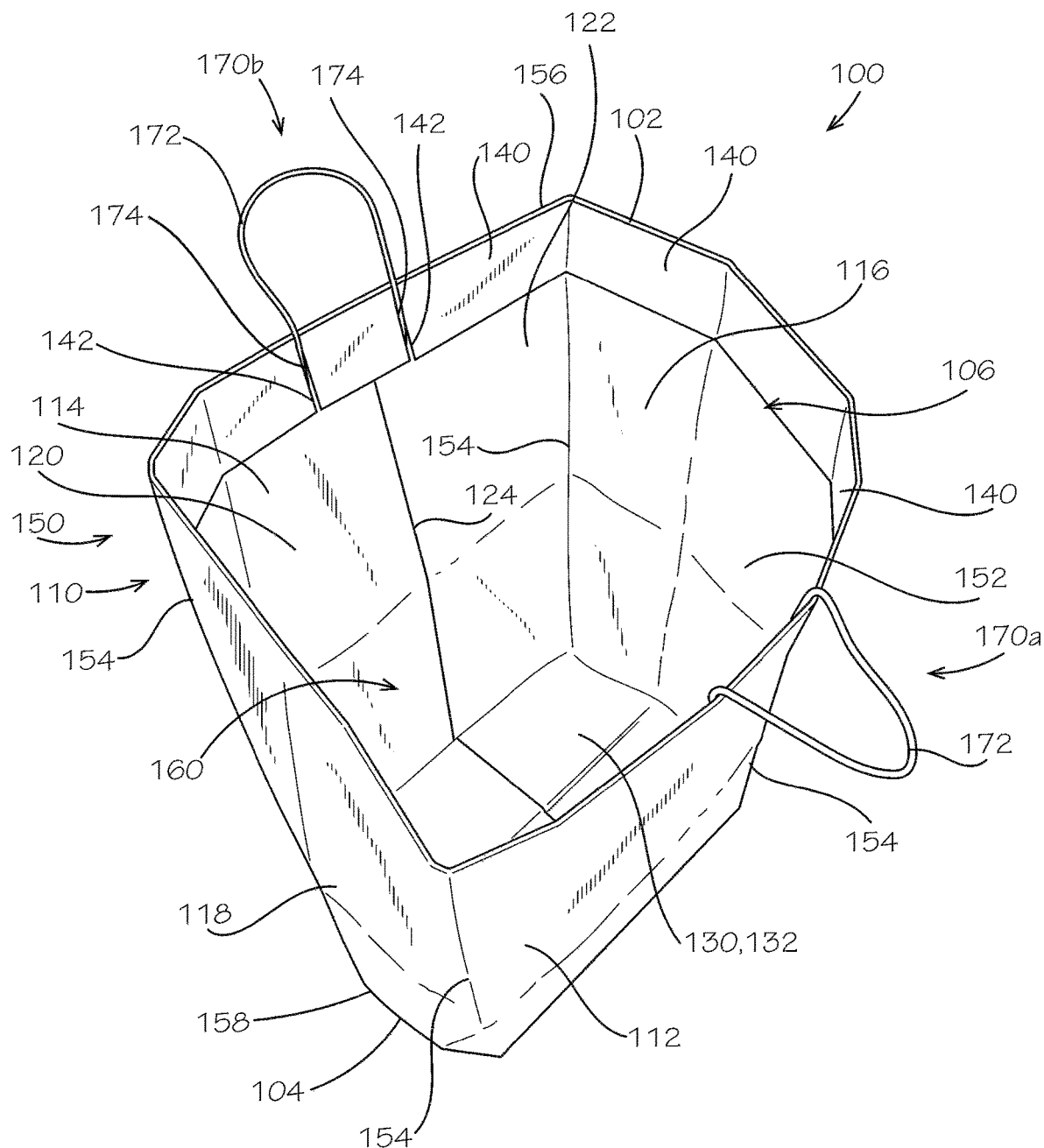
FIG. 1A is a top perspective view of a lawn refuse bag in an upright, open, and assembled orientation, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a refuse bag insert for holding open a lawn refuse bag, and associated methods, systems, devices, and various apparatus. Example aspects of the refuse bag insert can comprise at least one side wall and an end wall and at least one detachable rake. It would be understood by one of skill in the art that the disclosed refuse bag insert is described in but a few exemplary aspects among many. No particular terminology or description should be considered limiting on the disclosure or the scope of any claims issuing therefrom.

FIG. 1A illustrates a first aspect of a lawn refuse bag 100 according to the present disclosure. The lawn refuse bag 100 is depicted in an upright, assembled, and unfolded orientation, such that it is ready for use. As shown, the lawn refuse bag 100 can comprise a bag body 110 and a pair of handle assemblies 170a,170b extending from the bag body 110. Example aspects of the bag body 110 can be formed from a single bag blank 200 (shown in FIG. 2); however, in other aspects, the bag body 110 can be formed from multiple bag blanks. As shown, the bag body 110 can comprise a first end panel, such as a front sidewall panel 112, a second end panel, such as a rear sidewall panel 114, a first sidewall panel, such as a right sidewall panel 116, and a second sidewall panel, such as a left sidewall panel 118. Example aspects of the rear sidewall panel 114 can define a first rear sidewall subpanel 120 and a second rear sidewall subpanel 122 which can be joined together to retain the lawn refuse bag 100 in the assembled orientation, as shown. In various aspects, a joining seam 124 can be formed where the first rear sidewall subpanel 120 can be joined with the second rear sidewall subpanel 122. In other aspects, the joining seam 124 can be formed elsewhere on the side or end panels. For example, in another aspect, the front sidewall panel 112 may define first and second front sidewall subpanels that can be joined together to retain the lawn refuse bag 110 in the assembled orientation and to define the joining seam 124. In another example aspect, the joining seam 124 may be formed between any pair of adjacent panels, such as, for example, between the left sidewall panel 118 and the rear sidewall panel 120.

According to example aspects, the front sidewall panel 112, rear sidewall panel 114, right sidewall panel 116, and left sidewall panel 118 can define a sidewall enclosure 150 of the bag body 110 in the assembled orientation. An inner sidewall surface 152 of the sidewall enclosure 150 can define an interior cavity 160, as shown, which can be configured to receive lawn refuse (e.g., grass clippings, dirt, sticks, leaves 1310 (shown in FIG. 13A), etc.), as described in further detail below. Example aspects of the sidewall enclosure 150, such as the aspect depicted in FIG. 1A, can define a substantially rectangular cross-section. However, other aspects of the bag body 110 can define any other suitable cross-sectional shape, such as, for example, a square, circle, triangle, pentagon, and the like. As shown, the sidewall enclosure 150 can define four vertical corners 154, relative to the orientation shown, wherein each of the vertical corners 154 can be defined at an intersection of adjacent sidewall panels 112,114,116,118.

According to example aspects, the bag body 110 can define a top end 102, relative to the orientation shown, at a first end 156 of the sidewall enclosure 150, and a bottom end 104, relative to the orientation shown, at a second end 158 of the sidewall enclosure 150 opposite the first end 156. Example aspects of the bag body 110 can further comprise a base panel, such as a bottom panel 130, positioned at the bottom end 104 of the bag body 110 and oriented about perpendicular to the sidewall panels 112,114,116,118. The bottom panel 130 can extend fully between the sidewall panels 112,114,116,118, such that the bottom end 104 of the bag body 110 can be closed and access to the interior cavity 160 can be prohibited at the bottom end 104. As such, an inner bottom panel surface 132 of the bottom panel 130 can further define the interior cavity 160. However, as shown, the top end 102 of the bag body 110 can define a top opening 106 that can allow access to the interior cavity 160. In the present aspect, the top end 102 of the bag body 110 can be oriented in an open orientation, wherein lawn refuse can be inserted into the interior cavity 160 through the top opening 106 of the bag body 110. The top end 102 of the bag body 110 can also be oriented in a closed orientation, as further shown and described with respect to FIGS. 5 and 6. According to example aspects, in the upright and assembled orientation, as shown, the bottom panel 130 of the lawn refuse bag 100 can be configured to rest on a ground surface (e.g., a lawn or yard). Example aspects of the bottom panel 130 can be substantially flat and can provide suitable dimensions for providing a stable base for the lawn refuse bag 100, which can aid in preventing the lawn refuse bag 100 from tipping over from the desired upright orientation. The lawn refuse bag 100 can further be sized to allow a substantial amount of lawn refuse to be received within the interior cavity 160. Moreover, the top opening 106 of the bag body 110 can be dimensioned to allow a substantially sized cluster of lawn refuse to be inserted therethrough into the lawn refuse bag 100.

Various example aspects of the bag body 110 can comprise a substantially flexible material, such as paper, as shown. In some aspects, the bag body 110 can comprise a single layer of paper, while in other aspects, the bag body 110 can comprise a double layer of paper. In aspects comprising a double layer of paper, the stiffness and strength of the bag body 110 can be increased. Other aspects of the bag body 110 can comprise any other suitable number of layers. Furthermore, other aspects of the bag body 110 can define any other suitable flexible material, such as, for example, flexible plastic, fabric, or any other suitable flexible material or combination thereof. However, still other aspects of the bag body 110 can define a more rigid material, such as, for example, paperboard, polymer, metal, wood, composite, or any other suitable material or combination thereof. In some aspects, the inner sidewall surface 152 and/or inner bottom panel surface 132 can comprise a coating, such as, for example, a water resistant coating. Other aspects of the lawn refuse bag 100 may not comprise such a coating.

According to example aspects, each of the handle assemblies 170a,170b can comprise a handle portion 172 and a connection portion 174. The connection portion 174 can be coupled to the lawn refuse bag 100 and the handle portion 172 can extend away from the lawn refuse bag 100, as shown. In the present aspect, each handle assembly 170a, 170b can generally define an inverted U-shape, relative to the orientation shown, wherein the connection portion 174 can define the ends of the U-shape and the handle portion 172 can define the middle of the U-shape. As shown, a first one of the handle assemblies 170a can be coupled with the front sidewall panel 112 and a second one of the handle assemblies 170b can be coupled with the rear sidewall panel 114. Referring to the second handle assembly 170b, the connection portion 174 can be secured to the rear sidewall panel 114 to attach the handle assembly 170b to the lawn refuse bag 100, and the handle portion 172 can extend away from the top end 102 of the bag body 110 proximate the top opening 106. The connection portion 174 can be secured to the rear sidewall panel 114 on the inner sidewall surface 152 by a fastener, such as, for example, an adhesive, such as tape or glue. In other aspects, any other suitable type of fastener known in the art can be used. The first handle assembly 170a can be similarly formed and secured to the front sidewall panel 112.

In example aspects, such as the aspect depicted in FIG. 1A, the handle assemblies 170a,170b can be formed from twisted paper cord. Twisted paper cord can be made from paper that can be tightly twisted, and in some cases can define a crinkle texture, such that the strength and thickness of the paper can be increased. The increased strength and thickness of the handle assemblies 170a,170b can allow the lawn refuse bag 100 to be carried by the handle assemblies 170a,170b even when weighted down by lawn refuse. In other aspects, the handle assemblies 170a,170b can be formed from any other suitable material known in that art having a sufficient strength to allow for carrying the bag in weighted conditions. Furthermore, according to some example aspects, a flexible wire (not shown) or other similar reinforcing structure can extend through each of the handle assemblies 170a,170b to supply additional strength and stiffness to the handle assemblies 170a,170b.

According to example aspects, one or more flaps segments 140 can extend from the top end 102 of the bag body 110. For example, in the present aspect, each of the sidewall panels 112,114,116,118 can comprise a corresponding top flap segment 140 extending from the first end 156 of the sidewall enclosure 150. Each of the top flap segments 140 can be folded inward about 180° relative to the corresponding sidewall panel 112,114,116,118, such that the top flap segments 140 can lie against the inner sidewall surface 152 of the sidewall enclosure 150. The top flap segments 140 can be secured to the corresponding sidewall panels 112,114, 116,118 by a fastener, such as, for example, an adhesive, such as tape or glue. In other aspects, any other suitable fastener known in the art can secure the top flap segments 140 to the inner sidewall surface 152. In some aspects, as shown, one or more slits 142 can be formed in the top flap segments 140 extending from the front and rear sidewall panels 112,114 to accommodate folding the top flap segments 140 around the corresponding handle assemblies 170a,170b. For example, in the present aspect, the corresponding top flap segments 140 can comprise a pair of the slits 142 which can be configured to receive corresponding portions of the corresponding handle assembly 170a,170b therein. In some aspects, the top flap segments 140 of the front and rear sidewall panels 112,114 can partially overlay the corresponding handle assembly 170a,b, and the connection portions 174 can be secured between the top flap segment 140 and the corresponding front or rear sidewall panel 112,114. The second handle assembly 170b is shown and described in further detail with reference to FIG. 1B.

Furthermore, in some aspects, a first reinforcement strip (not shown) can be received between the bag body 110 and a corresponding one of the top flap segments 140 for granting added structure to the bag body 110 at the top end 102 thereof. Example aspects of the first reinforcement strip can be more rigid that the bag body 110. For example, in a particular aspect, the first reinforcement strip can be a substantially rectangular piece of paperboard. In the present aspect, the first reinforcement strip can be received between the front sidewall panel 112 and the corresponding top flap where the connection portion 174 of the first handle assembly 170a can be attached. As such, the first reinforcement strip can also serve to reinforce the first handle assembly 170a. According to example aspects, a second reinforcement strip (not shown) may also be providing for granting added structure to the rear sidewall panel 114 where the second handle assembly 170b can be attached. Moreover, in other aspects, reinforcement strips may also be provided between each of the right and left sidewall panels 116,118 and the corresponding top flap segments 140.

In the present aspect, the lawn refuse bag 100 is in an open orientation wherein the top opening 106 can be fully open and access to the interior cavity 160 through the top opening 106 can be unrestricted. The handle assemblies 170a,170b can be disengaged from one another in the open orientation, as shown. According to example aspects, the lawn refuse bag 100 can also be oriented in a closed orientation (shown in FIG. 5), wherein the handle portions 172 of the handle assemblies 170a,170b can be engaged with one another (for example, tied together) to close or partially close the top opening 106 of the lawn refuse bag 100. In the closed orientation, the lawn refuse received within the interior cavity 160 can be prevented from escaping the interior cavity 160 and additional lawn refuse can be prevented from insertion into the interior cavity 160. The closed orientation and the method for tying the handle assemblies 170a,170b together are shown and described in further detail with reference to FIGS. 5 and 6.

Figure 1B:
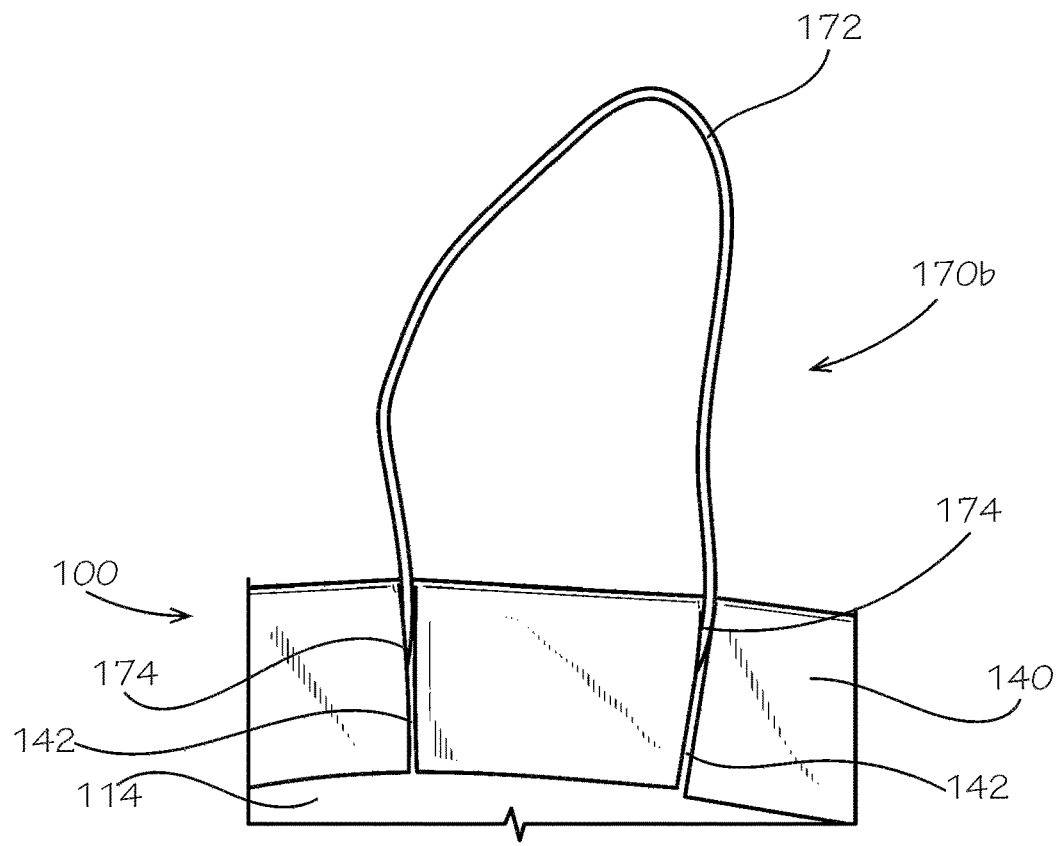
FIG. 1B is a detail view of a handle assembly of the lawn refuse bag of FIG. 1.
Figure 1C:
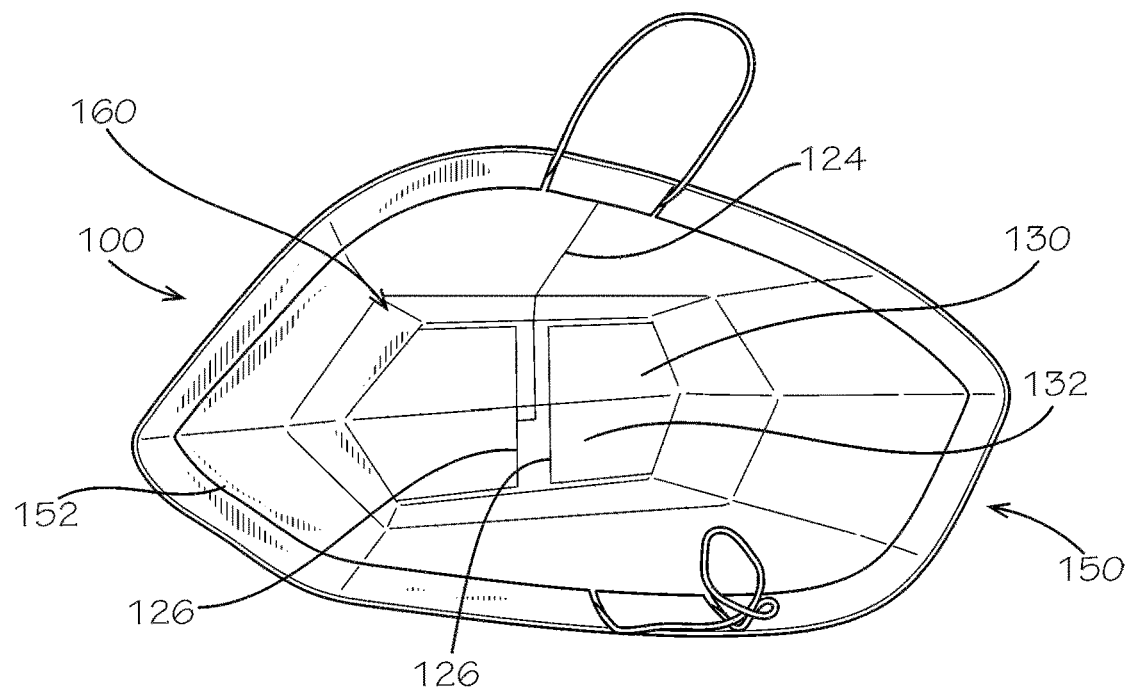
FIG. 1C is a top view of the lawn refuse bag of FIG. 1A.
Figure 1D:
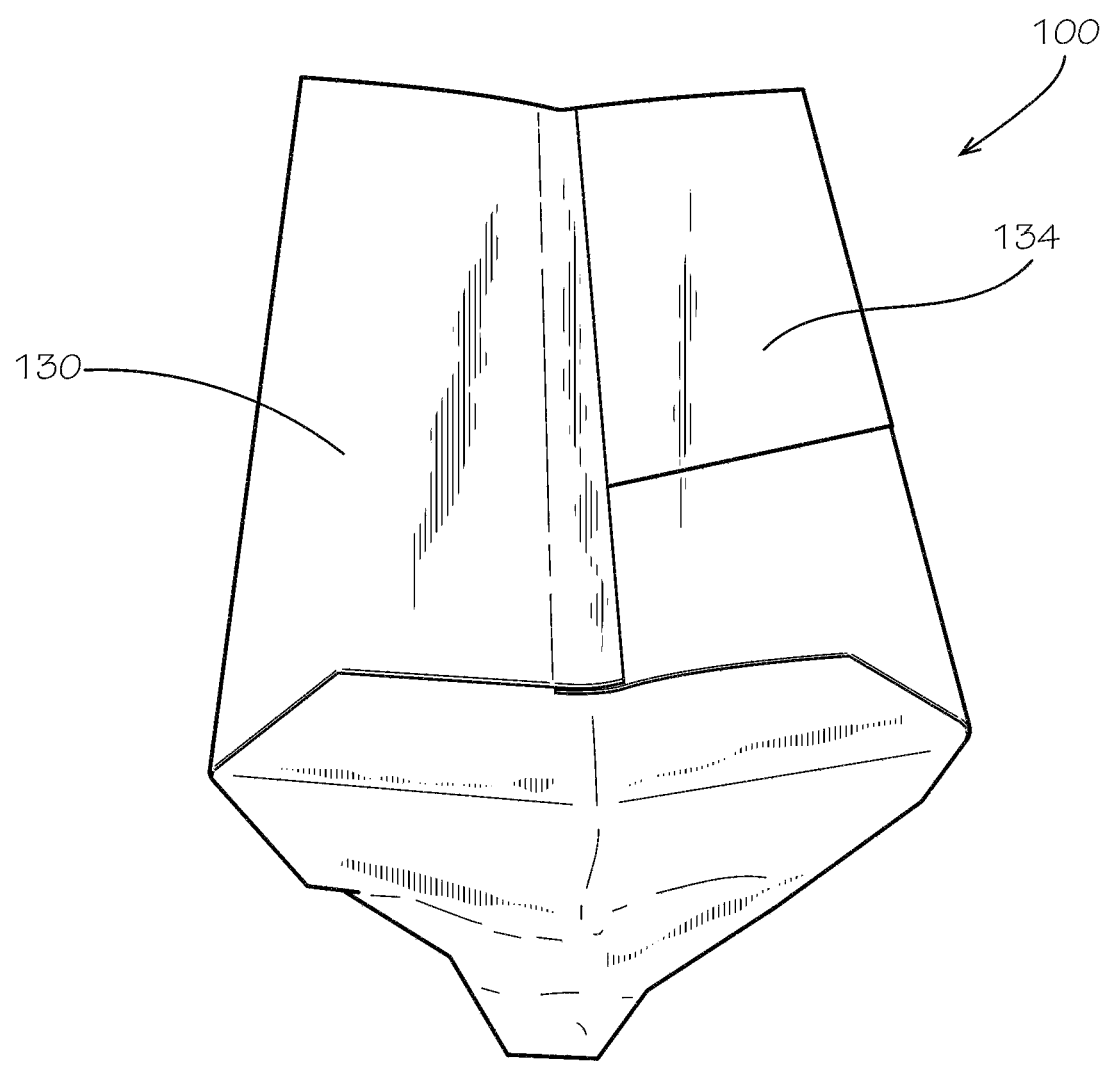
FIG. 1D is a bottom perspective view of the lawn refuse bag of FIG. 1A.

FIG. 1B is a close-up view of the second handle assembly 170b attached to the rear sidewall panel 114 of the lawn refuse bag 100. As shown, the corresponding top flap segment 140 is folded inward to lie against the rear sidewall panel 114 and can partially overlay the connection portions 174. FIG. 1C is top view of the lawn refuse bag 100, illustrating the inner sidewall surface 152 of the sidewall enclosure 150 and the interior cavity 160 for receiving the lawn refuse. The inner bottom panel surface 132 of the bottom panel 130, according to one particular example aspect of the lawn refuse bag 100, is also illustrated. As shown, the bottom panel 130 can be folded to form various bottom panel seams 126 of the bottom panel 130 in the assembled orientation. According to example aspects, the bottom panel 130 can be folded at a plurality of bottom panel bend lines 250 (shown in FIG. 2) to form the bottom panel seams 126. FIG. 1D illustrates an outer bottom panel surface 134 of the bottom panel 130, opposite the inner bottom panel surface 132 (shown in FIG. 1A), according to one particular example aspect of the lawn refuse bag 100. The various bottom panel seams 126 of the bottom panel 130 in the assembled orientation are also shown.

Figure 2:
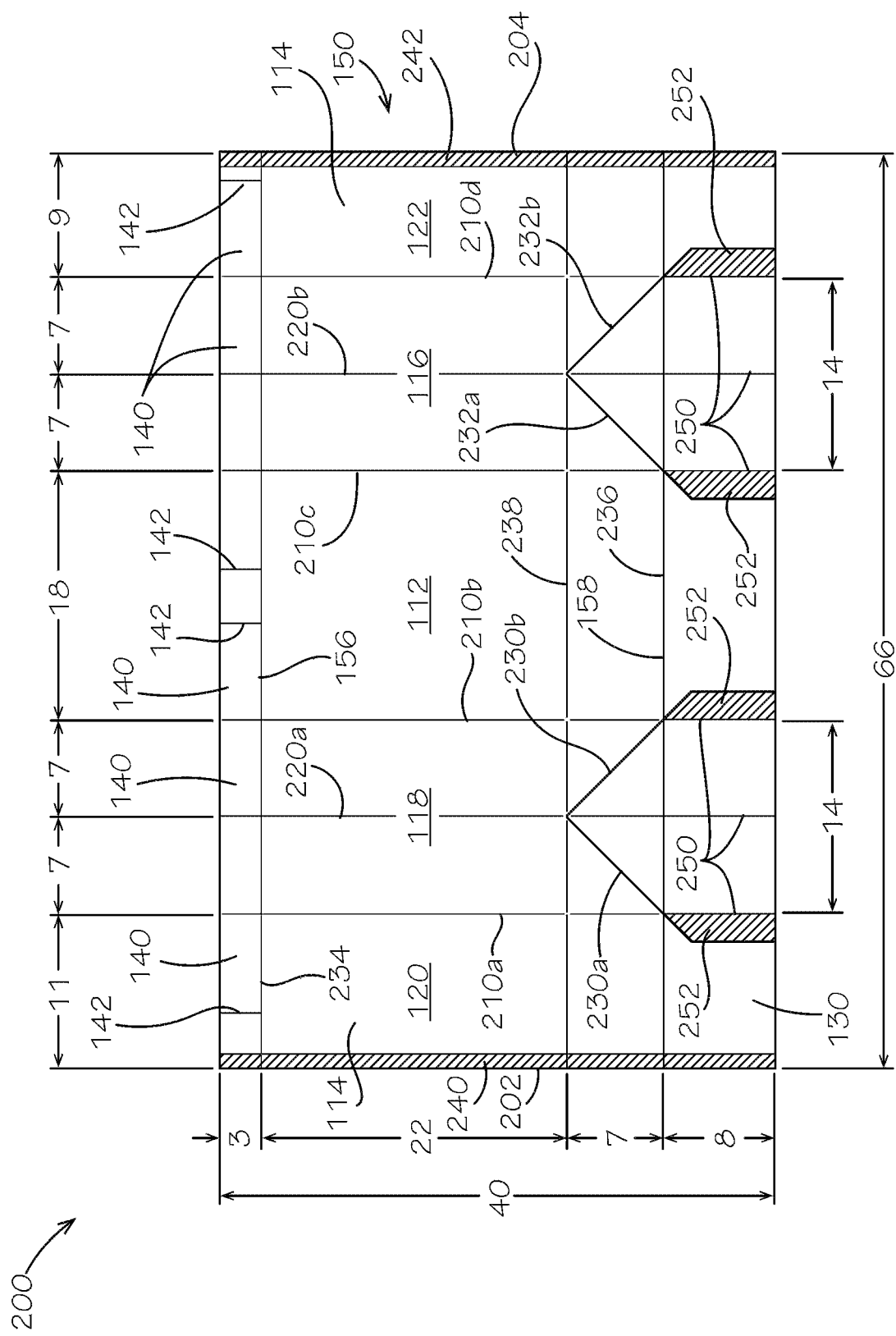
FIG. 2 is a bag blank in an unassembled orientation that can be assembled to form the lawn refuse bag of FIG. 1A.

FIG. 2 illustrates the bag blank 200 for forming the lawn refuse bag 100 (shown in FIG. 1A) in an unassembled orientation. Various dimensions for the bag blank 200 are shown in inches, according to an example aspect of the present disclosure. The dimensions disclosed herein are merely examples and should not be construed as limiting. As shown, the bag blank 200 can be a single, continuous blank defining a first blank end, such as a left blank end 202, relative to the orientation shown, and an opposite second blank end, such as a right blank end 204, relative to the orientation shown. Each of the sidewall panels 112,114,116, 118 can be connected to adjacent sidewall panels 112,114, 116,118 by a corner bend line 210, and the corner bend lines 210 can define the vertical corners 154 (shown in FIG. 1A) in the assembled orientation (shown in FIG. 1A). For example, the first rear sidewall subpanel 120 of the rear sidewall panel 114 can be connected to the left sidewall panel 118 by a first corner bend line 210a, the left sidewall panel 118 can be connected to the front sidewall panel 112 by a second corner bend line 210b, the front sidewall panel 112 can be connected to the right sidewall panel 116 by a third corner bend line 210c, and the right sidewall panel 116 can be connected to the second rear sidewall subpanel 122 of the rear sidewall panel 114 by a fourth corner bend line 210d.

Each of the left sidewall panel 118 and right sidewall panel 116 can also comprise a vertical center bend line 220a,b, respectively, relative to the orientation shown, extending along a centerline thereof. The center bend lines 220a,b can facilitate folding of the lawn refuse bag 100, as described in further detail with reference to FIG. 3A. Additionally, the bag blank 200 can define a horizontal bend line 238, relative to the orientation shown, that can extend across the sidewall panels 112,114,116,118 about perpendicular to the corner bend lines 210a,b,c,d and center bend lines 220a,b. As shown, the bend line 238 can be oriented between the first end 156 of the sidewall enclosure 150 and the second end 158 of the sidewall enclosure 150. Moreover, each of the left sidewall panel 118 and right sidewall panel 116 can define a pair of opposing angled bend lines 230a,b and 232a,b, respectively. For example, referring to the left sidewall panel 118, a first one of the angled bend lines 230a can extend at about a 45° angle between the corresponding center bend line 220a the intersection of the left sidewall panel 118 with the bottom panel 130 and the first rear sidewall subpanel 120. A second one of the angled bend lines 230b can extend at about a 45° angle between the center bend line 220a and the intersection of the left sidewall panel 118 with the bottom panel 130 and the front sidewall panel 112. As such, the pair of angled bend lines 230a,b can substantially define an inverted V-shape, wherein an apex of the inverted V-shape can intersect the horizontal bend line 238, as shown. The angled bend lines 232a,b of the right sidewall panel 116 can be similarly formed. The pairs of angled bend lines 230a,b and 232a,b and the bend line 238 can further aid in folding the lawn refuse bag 100, as described in further detail with reference to FIG. 3B. In the present aspect, the various bend lines of the bag blank 200 can be formed by a crease; however, in other aspects, some or all of the bend lines can be formed by a perforation, a series of perforations, or any other suitable arrangement configured to weaken the area of the bend line to facilitate bending along the bend line.

As shown, the top flap segments 140 can be formed as a single strip of material extending fully along the length of the sidewall enclosure 150 from the left blank end 202 to the right blank end 204. The top flap segments 140 can be divided from one another by the corresponding corner bend lines 210a,b,c,d. Furthermore, the top flap segments 140 can be connected to the first end 156 of the sidewall enclosure 150 by a top flap bend line 234. The bottom panel 130 can also extend along fully along the length of the sidewall enclosure 150 from the left blank end 202 to the right blank end 204, and can be connected to the second end 158 of the sidewall enclosure 150 by a bottom panel bend line 236. A first fastening flap, such as a left fastening flap 240, relative to the orientation shown, can be formed at the left blank end 202 and can extend along the first rear sidewall subpanel 120, the corresponding top flap segment 140, and the bottom panel 130. A second fastening flap, such as a right fastening flap 242, relative to the orientation shown, can be formed at the right blank end 204 and can extend along the second rear sidewall subpanel 122, the corresponding top flap segment 140, and the bottom panel 130. A first step in assembling the lawn refuse bag 100 from the blank can comprise overlapping and securing the left fastening flap 240 to the right fastening flap 242, which can define the joining seam 124 (shown in FIG. 1A) in the assembled orientation.

According to example aspects, a second step in assembling the lawn refuse bag 100 can comprising folding the bottom panel 130 and securing the bottom panel 130 in the folded configuration. As shown, multiple bottom panel bend lines 250 can be provided to facilitate folding the bottom panel 130 into the orientation substantially perpendicular to the sidewall enclosure 150 in the assembled orientation (shown in FIG. 1A). As shown, the bottom panel 130 can also comprise one or more base panel attachment regions, such as bottom panel attachment regions 252, that can be secured to the lawn refuse bag 100 (e.g., each other and/or other portions of the bottom panel 130) to retain the bottom panel 130 in the folded configuration of the assembled orientation, and to form the bottom panel seams 126 (shown in FIGS. 1C and 1D). The bottom panel attachment regions 252 can be secured in the folded configuration by a fastener, such as, for example, an adhesive, such as glue or tape. In other aspects, the first and second steps for assembling the lawn refuse bag 100 can be performed in reverse order.

Figure 3A:
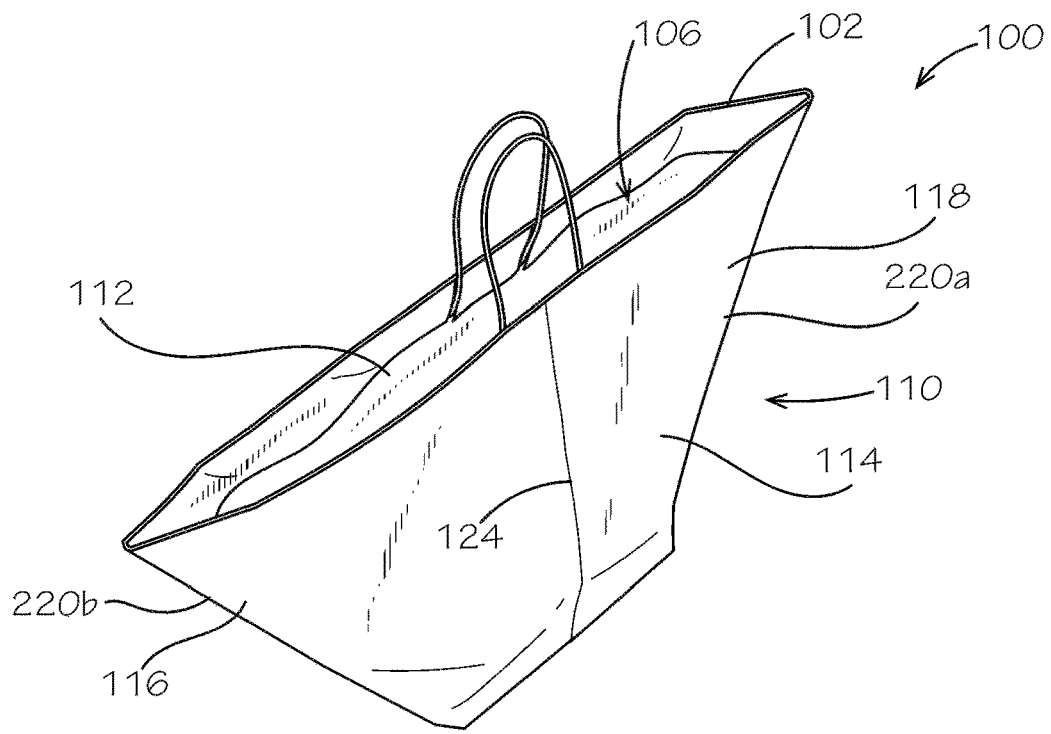
FIG. 3A is a top perspective view of the lawn refuse bag of FIG. 1A in a partially folded orientation.
Figure 3B:
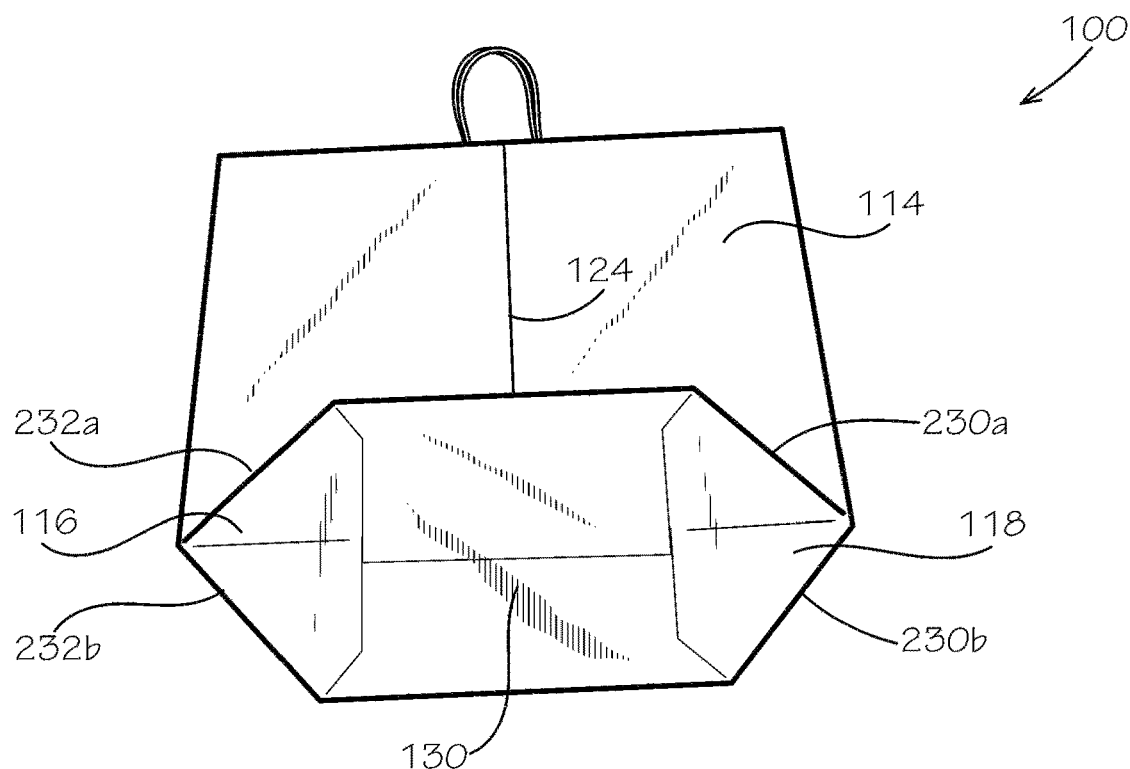
FIG. 3B is a front view of the lawn refuse bag of FIG. 1A in a folded orientation.

FIG. 3A illustrates the lawn refuse bag 100 in a partially folded orientation. As shown, the lawn refuse bag 100 can be folded along the center bend lines 220a,b of the left sidewall panel 118 and right sidewall panel 116, respectively. In folding the lawn refuse bag 100 along the center bend lines 220a,b, the front sidewall panel 112 and rear sidewall panel 114 can be drawn towards one another, closing or partially closing the top opening 106 at the top end 102 of the bag body 110. FIG. 3B illustrates the lawn refuse bag 100 in a fully folded orientation. The lawn refuse bag 100 can be folded along the angled bend lines 230a,b of the left sidewall panel 118 and the angled bend lines 232a,b of the right sidewall panel 116. The lawn refuse bag 100 can then be further folded along the bend line 238, such that at least a portion of the bottom panel 130 of the lawn refuse bag 100 can be folded to lie substantially flat against the rear sidewall panel 114, as shown. In other aspects, the at least a portion of the bottom panel 130 can be folded to lie substantially flat against the front sidewall panel 112 (shown in FIG. 1).

Figure 4A:
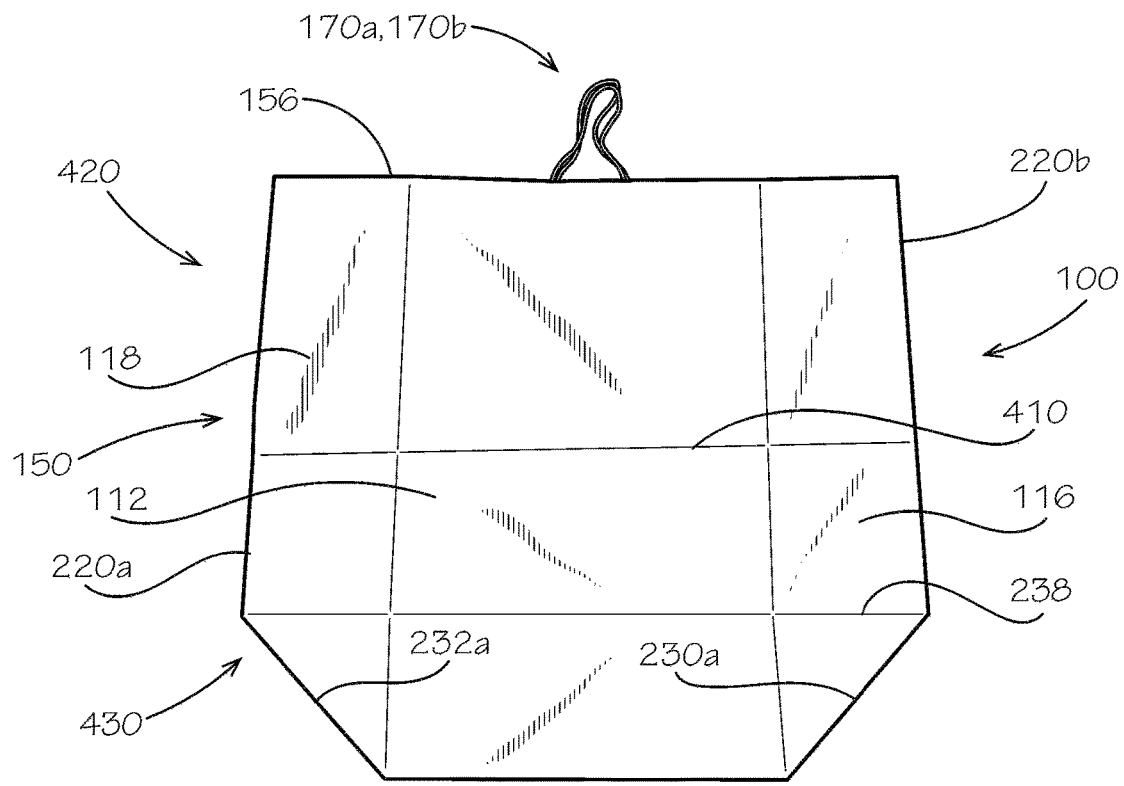
FIG. 4A is a front view of the lawn refuse in the partially folded orientation, according to another aspect of the present disclosure.
Figure 4B:
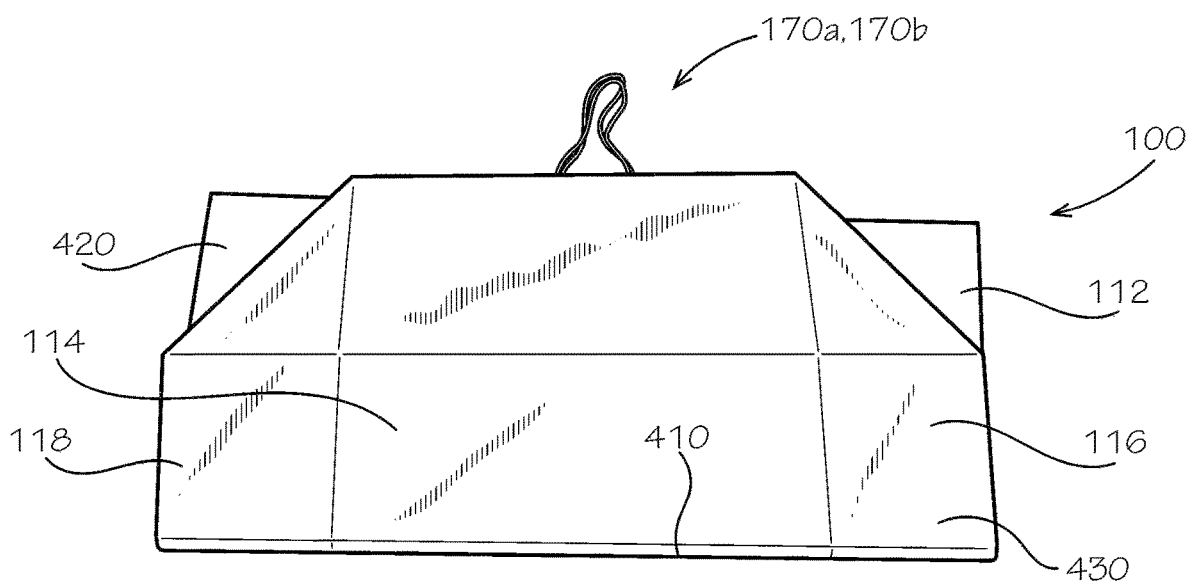
FIG. 4B is a front view of the lawn refuse bag of FIG. 4A in the folded orientation, according to another aspect of the present disclosure.

FIGS. 4A and 4B illustrate another example method of folding another aspect of the lawn refuse bag 100. As shown in FIG. 4A, the lawn refuse bag 100 can be folded in a similar manner to the folded lawn refuse bag 100 shown in FIGS. 3A and 3B. Example aspects of the current lawn refuse bag 100 can also comprise an additional bend line 410 extending horizontally, relative to the orientation shown, across the sidewall panels 112,114,116,118 (rear sidewall panel 114 shown in FIG. 1). The bend line 410 can be oriented between the bend line 238 and the first end 156 of the sidewall enclosure 150, and can be substantially perpendicular to the same. The bend line 410 can also generally define an upper region 420 and an opposite lower region 430 of the lawn refuse bag 100. As shown in FIG. 4B, the lawn refuse bag 100 can further be folded at the bend line 410, such that the lower region 430 of the lawn refuse bag 100 can lie substantially flat against the upper region 420 of the lawn refuse bag 100 to further reduce the footprint of the folded lawn refuse bag 100.

Figure 5:
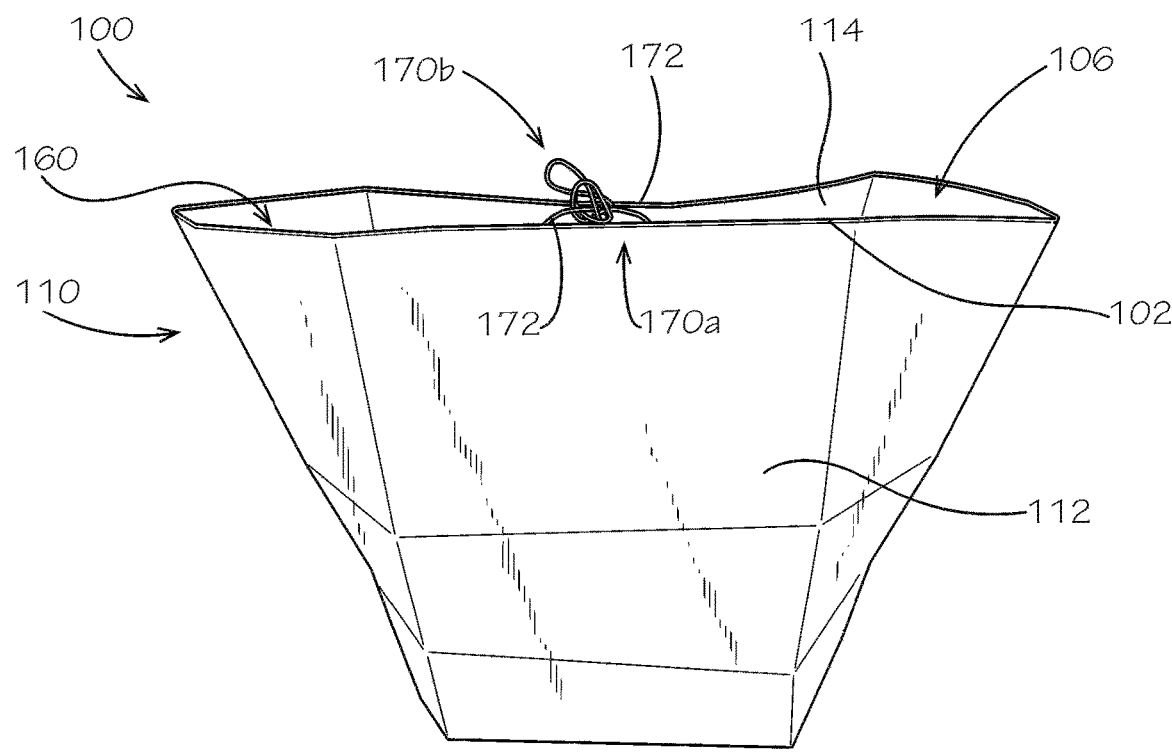
FIG. 5 is a top perspective view of the lawn refuse bag of FIG. 1A in a closed orientation.
Figure 6:
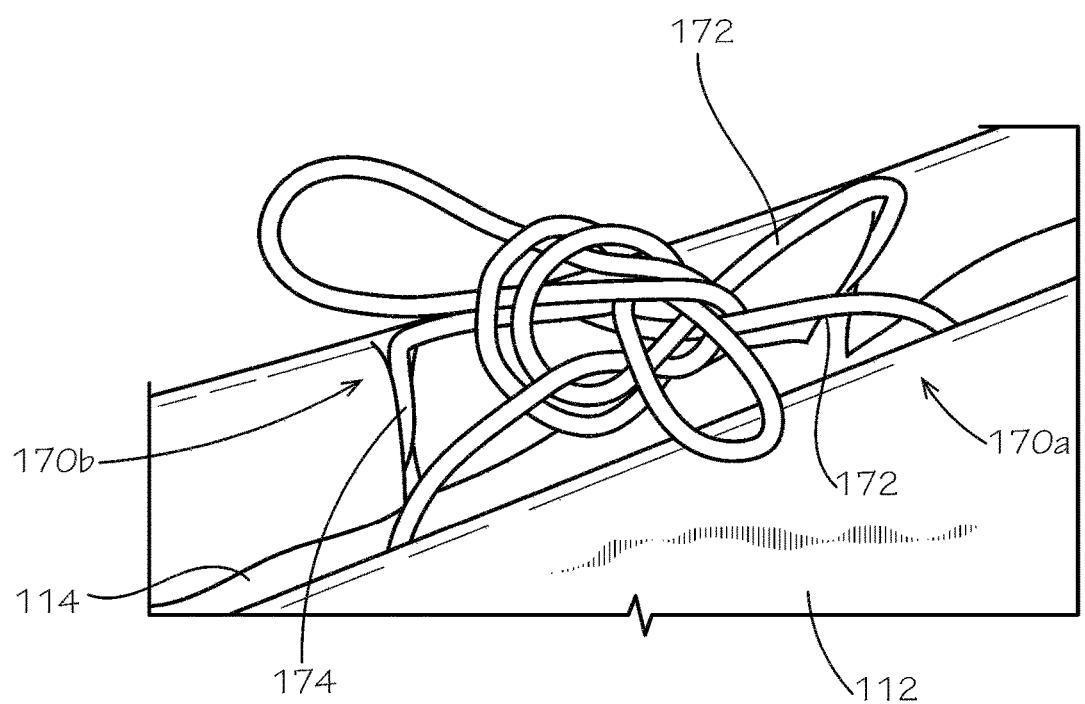
FIG. 6 is a detail view of a pair of handle assemblies of the lawn refuse bag of FIG. 1A in a tied configuration.

FIG. 5 illustrates the top end 102 of the bag body 110 in a closed orientation. In the closed orientation, the top end 102 of the bag body 110 can be fully closed or can be partially closed, as shown. As shown, in the closed orientation, the handle portion 172 of the first handle assembly 170a can be tied together with the handle portion 172 of the second handle assembly 170b. For example, in the present aspect, the handle portions 172 can be tied together in the fashion of a double knot, such that the handle portions 172 can be retained in a tied configuration. However, in other aspects, the handle portions 172 can be tied together in a single knot or in any other suitable fashion that can retain the handle portions 172 in the tied configuration. When the handle portions 172 are tied together, the front sidewall panel 112 and rear sidewall panel 114 can be drawn together at the top end 102 of the bag body 110, and the top opening 106 of the bag body 110 can be closed or partially closed, as shown. As such, in the closed orientation, the lawn refuse received within the interior cavity 160 can be restricted from escaping the interior cavity 160 and additional lawn refuse can be prevented from insertion into the interior cavity 160. FIG. 6 is a detail view of the handle assemblies 170a,170b in the tied configuration.

As such, an example method for using the lawn refuse bag 100 can comprising providing the lawn refuse bag 100 comprising the bag body 110, the first handle assembly 170a, and the second handle assembly 170b, wherein the bag body 110 defines the interior cavity 160 and the top end 102, and the top end 102 defines the top opening 106. The method can further comprise inserting lawn refuse into the interior cavity 160 through the top opening 106 and then tying the handle portion 172 of the first handle assembly 170a with the handle portion 172 of the second handle assembly 170b to orient the top end 102 of the lawn refuse bag 100 in the closed orientation. To insert the lawn refuse into the lawn refuse bag 100, a cluster of the lawn refuse can be shifted (e.g., scooped, shoveled, etc.) from the lawn or yard into the interior cavity 160 manually or using a tool, such as, for example a rake 750 (shown in FIG. 7). In some aspects, the method can further comprise unfolding the lawn refuse bag 100 from a folded orientation to an unfolded orientation prior to inserting the lawn refuse therein. The method may also comprise opening the top end 102 of the lawn refuse bag to orient the top end 102 in an open orientation prior to inserting the lawn refuse therein. Additional aspects can further comprise assembling the bag blank 200 to form the lawn refuse bag 100. In one aspect, the lawn refuse bag 100 can be oriented in the upright orientation, as shown in FIG. 1A, wherein the bottom panel 130 of the bag body 110 is configured to lie on a ground surface (e.g., the yard, lawn, etc.). The lawn refuse can be scooped up off of the ground surface and dumped into the interior cavity 160. In another aspect, the lawn refuse bag can be oriented in a sideways orientation (shown in FIG. 11), wherein the rear sidewall panel 114 of the bag body 110 can be configured to lie on the ground surface. In other aspects, any of the front sidewall panel 112, right sidewall panel 116, and left sidewall panel 118 can be configured to lie on the ground surface in the sideways orientation. In the sideways orientation, the lawn refuse can be shoveled directly from the ground surface into the interior cavity 160 through the top opening 106, which can be oriented adjacent to the ground surface.

Figure 7:
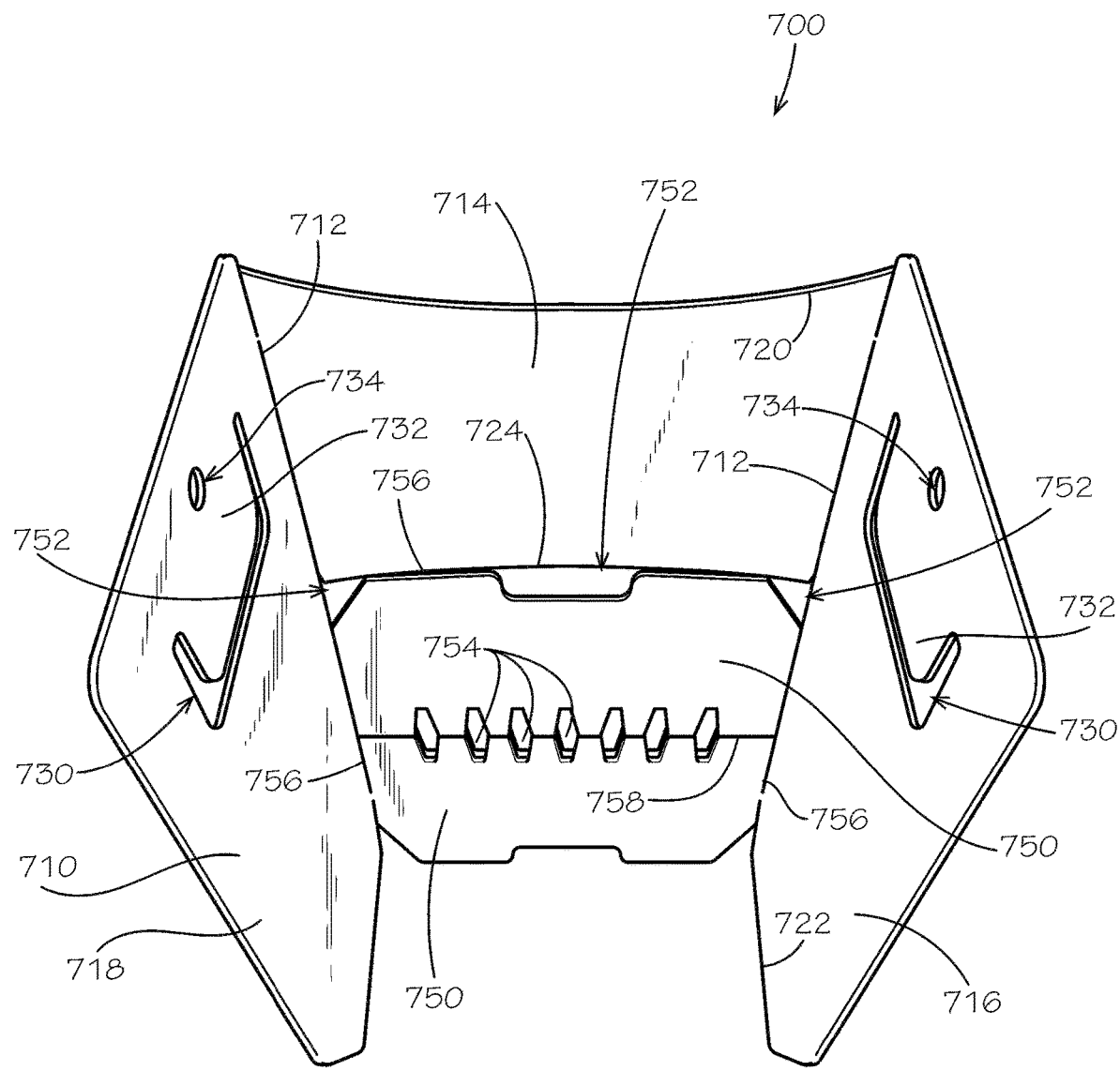
FIG. 7 is a top perspective view of a refuse bag insert comprising a bag stand and a pair of rakes, in accordance with one aspect of the present disclosure.

FIG. 7 illustrates a first aspect of a refuse bag insert 700 according to the present disclosure. According to example aspects, the refuse bag insert 700 can be formed as a single, continuous insert blank. In other aspects, the refuse bag insert 700 can formed from multiple insert blanks. As shown, the refuse bag insert 700 can comprise a bag stand 710 and at least one rake 750. In the present aspect, the refuse bag insert 700 can comprise first and second matching rakes 750. Example aspects of bag stand 710 can comprise a first side wall, for example a right wall 716, a second side wall, for example a left wall 718, and an end wall, for example, a rear wall 714, extending between the left wall 718 and the right wall 716. Other example aspects of the bag stand 710 can comprise more or fewer walls. For example, the bag stand 710 may further comprise a front wall (not shown). Alternatively, the bag stand 710 may comprise the rear wall 714 and only one of the side walls; for example, the rear wall 714 and the left wall 718 only, or the rear wall 714 and the right wall 716 only. According to example aspects, each of the left wall 718 and right wall 716 can be hingedly connected to the rear wall 714 by a stand bend line 712. The stand bend lines 712 can be formed by, for example, a crease, a perforation, a series of perforations, or the like. In the present aspect, the stand bend lines 712 can be formed by a series of perforations 850 (shown in FIG. 8B).

Figure 12:
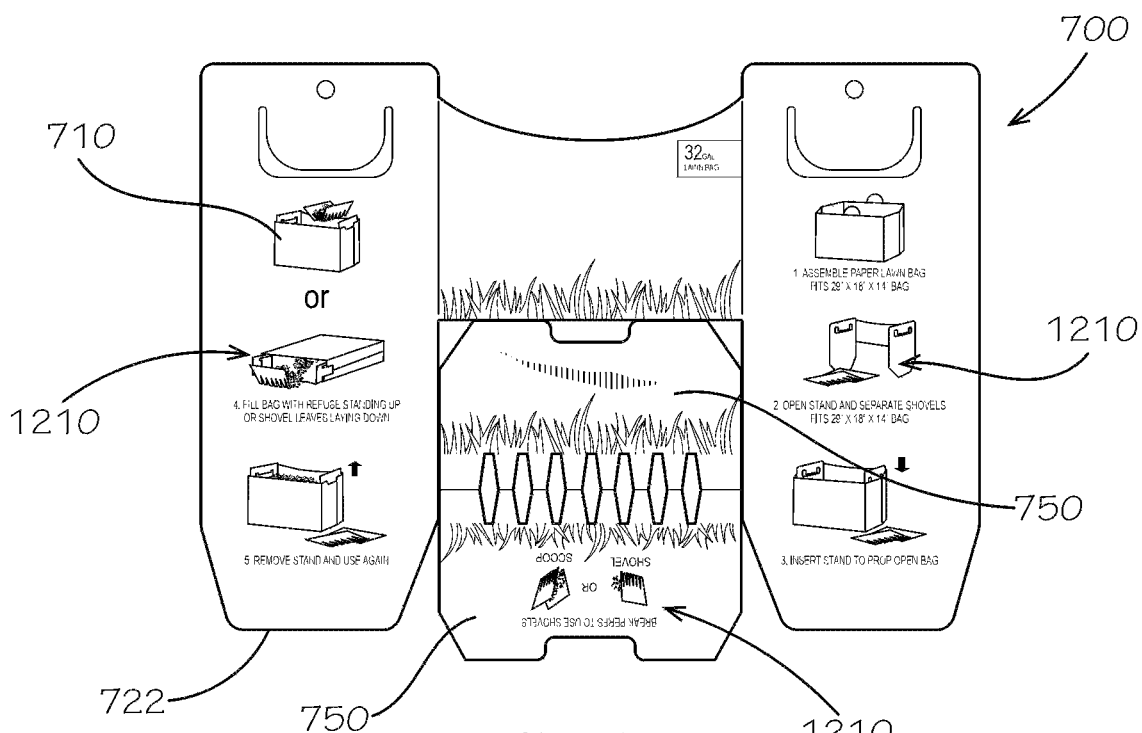
FIG. 12 illustrates the refuse bag insert comprising indicia printed thereon, according to another aspect of the present disclosure.

Example aspects of the bag stand 710 can generally define a top stand end 720 and a bottom stand end 722 opposite the top stand end 720. In the present aspect, each of the left wall 718 and right wall 716 can extend from the top stand end 720 to the bottom stand end 722, while the rear wall 714 can extend from the top stand end 720 to an intermediate point 724 between the top stand end 720 and bottom stand end 722. In the present aspect, the intermediate point 724 can be closer to the top stand end 720 than the bottom stand end 722. However, in other aspects, the intermediate point 724 can be about equidistant between the top and bottom stand ends 720,722 or can be closer to the bottom stand end 722. According to example aspects, the pair of rakes 750 can extend between the left wall 718 and right wall 716 from the intermediate point 724 to the bottom stand end 722. In other aspects, the pair of rakes 750 may extend beyond the bottom stand end 722 (as shown in FIG. 12) or may not extend as far as the bottom stand end 722.

According to example aspects, bag stand tear lines 756 formed by creasing, perforating, or other weakening means can be formed between the bag stand 710 and the rakes 750, such that the rakes 750 can be detached from the bag stand 710 for use separately from the bag stand 710. A rake tear line 758 can also be formed between the pair of rakes 750, such that the rakes 750 can be separated from one another for independent use. Furthermore, as shown, a plurality of teeth cut-outs 754 can be formed between the rakes 750 at the rake tear line 758. In the present aspect, the teeth cut-outs 754 can be formed as punch-out regions supplied with a weakened periphery (such as by perforations) to allow a user to punch through and remove each of the teeth cut-outs 754 to form corresponding teeth openings 910 (shown in FIG. 9). In another aspect, the teeth cut-outs 754 can be removed during the manufacturing process or by a worker in a factory. Additionally, one or more rake cut-outs 752 can be defined in the refuse bag insert 700 between the rear wall 714 and an adjacent one of the rakes 750, which can wholly or partially define an outer edge of the rake 750. In the present aspect, each of the rake cut-outs 752 can be formed as an opening, as shown. In other aspects, each of the rake cut-outs 752 may be formed as a punch-out region, similar to the teeth cut-outs 754, such that the rake cut-outs 752 can be punched through and removed by a user to form the illustrated opening. The rakes 750 are shown and described in further detail with respect to FIG. 9.

According to example aspects, as shown, each of the left wall 718 and right wall 716 can define a slot, for example, a substantially U-shaped slot 730, formed therein proximate to the top stand end 720 of the bag stand 710. Each of the U-shaped slots 730 can define a retainer tab 732 extending substantially downward, relative to the orientation shown. According to example aspects, the retainer tabs 732 can facilitate retaining the bag stand 710 on the lawn refuse bag 100 (shown in FIG. 1A), as is shown and described in further detail with respect to FIG. 10. Each of the left wall 718 and right wall 716 can also define a finger opening 734 formed between the corresponding retainer tab 732 and the top stand end 720 of the bag stand 710. According to example aspects, the finger openings 734 can be configured to receive a finger, or fingers, of a user to facilitate inserting and removing the bag stand 710 from the lawn refuse bag 100, as is described in further detail below.

Example aspects of the refuse bag insert 700 can be formed from a rigid or semi-rigid material, such as, for example, a corrugated plastic sheet. An example corrugated plastic sheet material 860 of the refuse bag insert 700 is illustrated in detail in FIG. 8C. In other aspects, the refuse bag insert 700 can be formed from any other suitable rigid or semi-rigid material, including, but not limited to, paperboard such as linerboard, corrugated paperboard, a polymer, plastic, metal, alloy, wood, composite, or any suitable material or combination thereof.

Figure 8A:
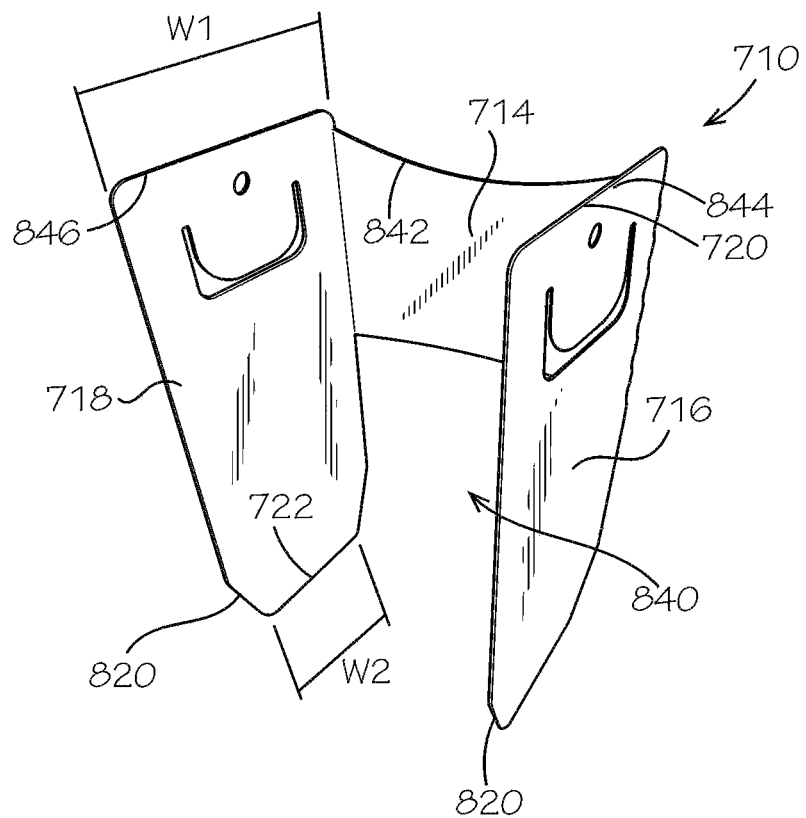
FIG. 8A is a top perspective view of the bag stand of FIG. 7.

FIG. 8A illustrates the bag stand 710 with the rakes 750 (shown in FIG. 7) removed. As shown, with the rakes 750 removed, a gap 840 can be formed between the rear wall 714 and the bottom stand end 722 of the bag stand 710. As such, the rear wall 714 can be suspended between the left wall 718 and the right wall 716. In the present aspect, the rear wall 714 can define a concave rear top edge 842 at the top stand end 720 of the bag stand 710, while the right wall 716 and left wall 718 can define substantially flat right and left top edges 844,846, respectively, at the top stand end 720. As such, as shown, the right and left top edges 844,846 can be oriented at a greater height than the rear top edge 842. However, in other aspects, the rear top edge 842 may not be concave and may be oriented at any suitable height.

Moreover, according to example aspects, each of the left wall 718 and right wall 716 can define a substantially consistent width $W_1$ extending from the top stand end 720 of the bag stand 710 towards the bottom stand end 722 of the bag stand 710. However, proximate to the bottom stand end 722 of the bag stand 710, each of the right and left walls 716,718 can define a tapered section 820, such that a width $W_2$ of the right and left walls 716,718 at the bottom stand end 722 can be smaller than the width $W_1$ at the top stand end 720. The tapered sections 820 of the right and left walls 716,718 can facilitate sliding the bag stand 710 into the lawn refuse bag 100 (shown in FIG. 1A), as described in further detail with respect to FIG. 10.

Figure 8B:
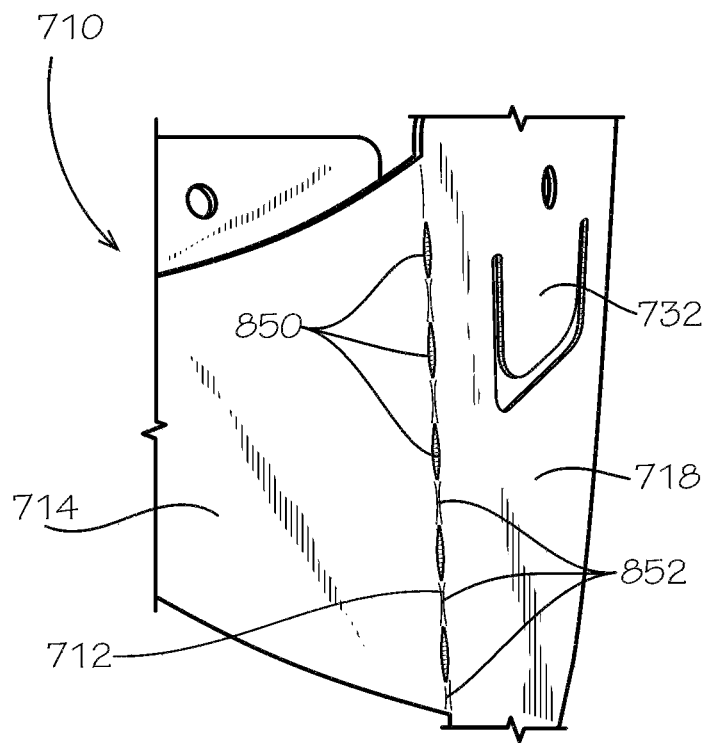
FIG. 8B is a perspective view illustrating a stand bend line of the bag stand of FIG. 7.
Figure 8C:
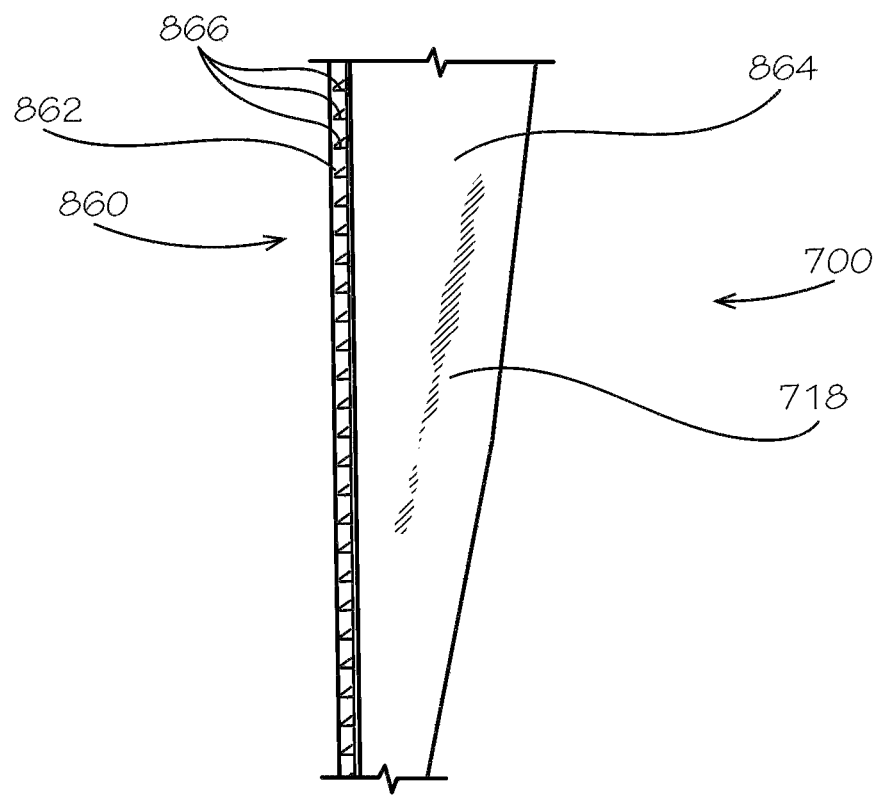
FIG. 8C is a perspective view illustrating a corrugated paper sheet material of the bag stand of FIG. 7.

FIG. 8B illustrates a close-up view of the stand bend line 712 formed between the left wall 718 and the rear wall 714 of the bag stand 710. As shown, the stand bend line 712 can be formed by a series of perforations 850. The perforations 850 can be spaced apart, as shown, with connecting segments 852 formed therebetween, wherein the connecting segments 852 can connect the left wall 718 to the rear wall 714. The stand bend line 712 formed between the right wall 716 (shown in FIG. 7) and the rear wall 714 can be similarly formed. FIG. 8C illustrates a close-up view of the corrugated plastic sheet material 860 of the refuse bag insert 700. As shown, the corrugated plastic sheet material 860 can comprise a substantially planar first layer 862, a substantially planar second layer 864 extending about parallel to the first layer 862, and a corrugated layer 866 between the first and second layers 862,864.

Figure 9:
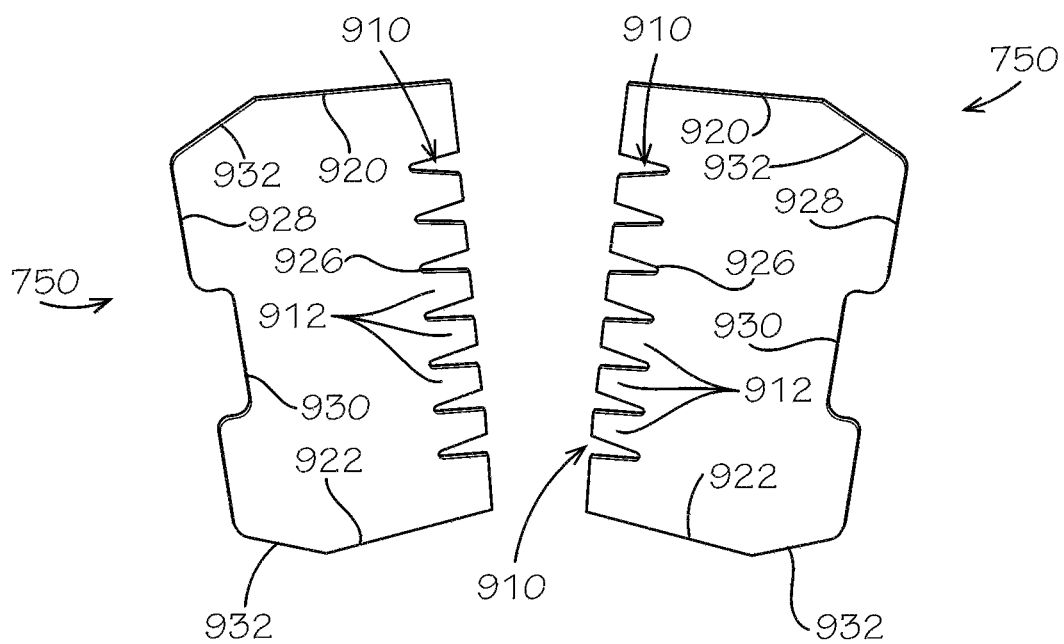
FIG. 9 is a front view of the pair of rakes of FIG. 7.

FIG. 9 illustrates the rakes 750 removed from the bag stand 710 (shown in FIG. 7). For example, the rakes 750 can be detached from the bag stand 710 by tearing along the bag stand tear lines 756 (shown in FIG. 7). The rakes 750 can further be detached from one another by tearing along the rake tear line 758 (shown in FIG. 7) such that each of the rakes 750 can be independently used. Additionally, the teeth cut-outs 754 (shown in FIG. 7) formed between the rakes 750 can be punched out to define the teeth openings 910. According to example aspects, each of the rakes 750 can define a first rake end 920, a second rake end 922 opposite the first rake end 920, a teeth side 926, and a grip side 928 opposite the teeth side 926. As shown, the teeth openings 910 can define a plurality of teeth 912 extending from the teeth side 926 of each rake 750. In some aspects, as shown, the teeth 912 can taper away from the teeth side 926, while in other aspects, the teeth 912 may not taper.

According to example aspects, the rakes 750 can be used to shift (e.g., scoop, shovel, etc.) a cluster of lawn refuse from the lawn or yard into the lawn refuse bag 100 (shown in FIG. 1A). The rakes 750 can further be used to shift additional clusters of lawn refuse into the lawn refuse bag 100 until the lawn refuse bag 100 is full or until all of the lawn refuse is received within the lawn refuse bag 100, whichever comes first. According to example aspects, the teeth 912 of the rakes 750 can facilitate grabbing lawn refuse from the lawn or yard. In some aspects, the teeth openings 910 can allow small debris, such as pebbles, to pass therethrough, but can be narrow enough to prohibit larger debris, such as leaves 1310 (shown in FIG. 13A), from passing therethrough. Example aspects of the rakes 750 can further define hand indentation 930 formed at the grip side 928, as shown. A user can grip the rakes 750 at the hand indentations 930 when using the rakes 750 to gather lawn refuse. In some aspects, the hand indentations 930 can indicate a preferred gripping location to facilitate the best and easiest use of the rakes 750. Furthermore, as shown, in some aspects, each of the first rake ends 920 and second rake ends 922 can define an angled portion 932 tapering towards the corresponding grip side 928. In other aspects, the lawn refuse can also, or alternatively, be shifted into the lawn refuse bag 100 manually or using another tool.

Figure 10:
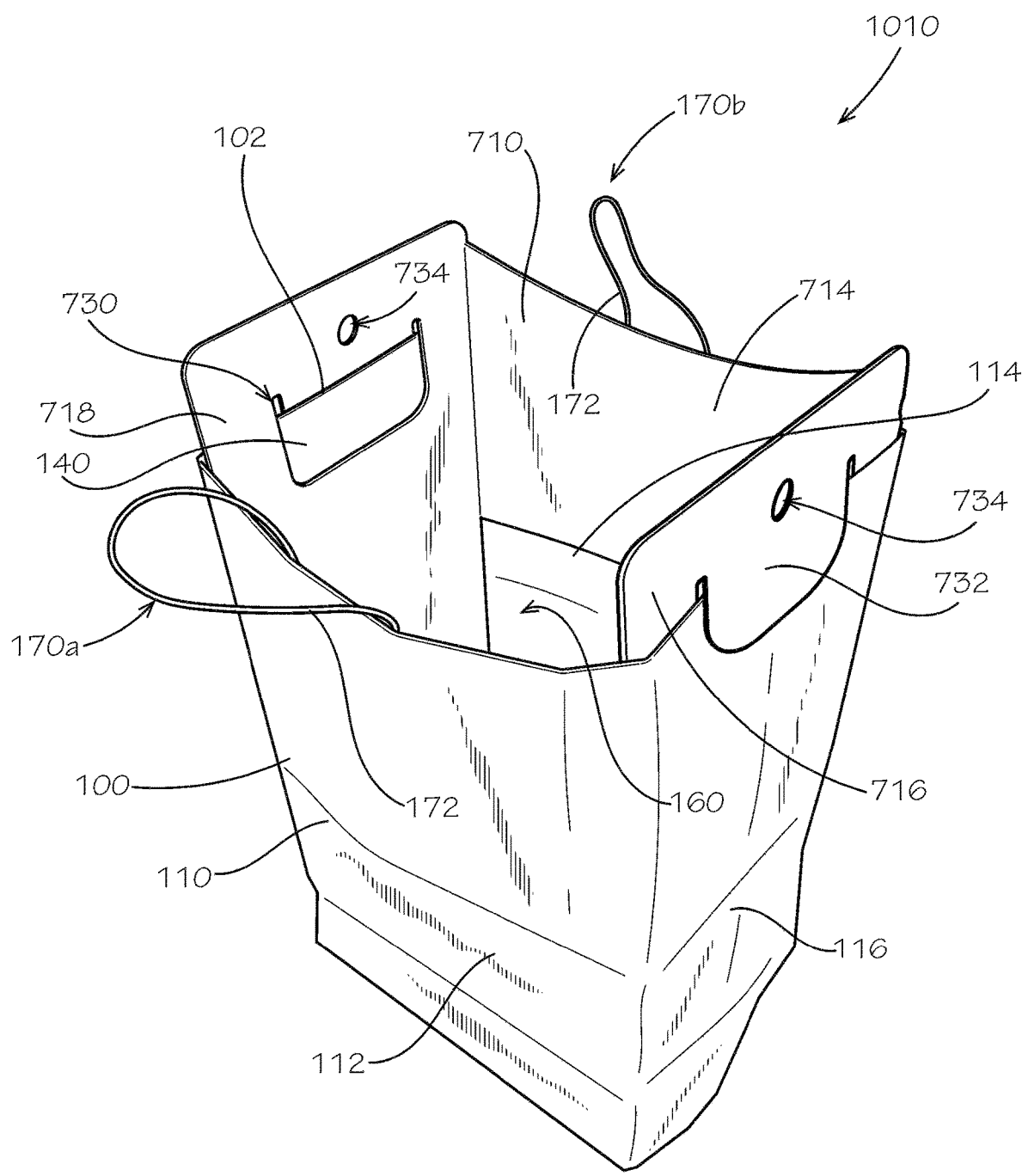
FIG. 10 is a top perspective view of the bag stand of FIG. 7 assembled with the lawn refuse bag of FIG. 1 to define a lawn refuse disposal assembly.

FIG. 10 illustrates the bag stand 710 assembled with the lawn refuse bag 100, which together can define a lawn refuse disposal assembly 1010. According to example aspects, the tapered sections 820 (shown in FIG. 8A) of the right and left wall 716,718 of the bag stand 710 can allow the bottom stand end 722 (shown in FIG. 7) to be easily inserted and slid down into the interior cavity 160 of the bag body 110. As shown, the bag stand 710 can be substantially received within the interior cavity 160 of the lawn refuse bag 100. The left wall 718 of the bag stand 710 can extend along the left sidewall panel 118 (shown in FIG. 1A) of the lawn refuse bag 100, the right wall 716 of the bag stand 710 can extend along the right sidewall panel 116 of the lawn refuse bag 100, and the rear wall 714 can extend partially along the rear sidewall panel 114 of the of lawn refuse bag 100. According to example aspects, the bottom stand end 722 of the bag stand 710 can abut the bottom panel 130 (shown in FIG. 1A) of the lawn refuse bag 100. The rigid material of the bag stand 710 can provide added structure to the lawn refuse bag 100 at the rear, right, and left sidewall panels 114,116,118 to aid in preventing collapsing and/or tipping of the lawn refuse bag 100 during use.

Furthermore, as shown, a portion of the top end 102 of the bag body 110 at the left sidewall panel 118 (such as the corresponding top flap segment 140) can be inserted into the U-shaped slot 730 of the left wall 718, such that the corresponding retainer tab 732 can be oriented external to the lawn refuse bag 100. As such, a portion of the left sidewall panel 118 and the corresponding top flap segment 140 can be gripped between the left wall 718 of the bag stand 710 and the corresponding retainer tab 732 to retain the left wall 718 against the left sidewall panel 118. Similarly, a portion of the top end 102 of the bag body 110 at the right sidewall panel 116 can be inserted into the corresponding U-shaped slot 730 of the right wall 716 to be retained between the right wall 716 and the corresponding retainer tab 732. Thus, the bag stand 710 can support and engage the lawn refuse bag 100 to retain the lawn refuse bag 100 in the desired upright and open orientation, as shown.

Figure 13B:
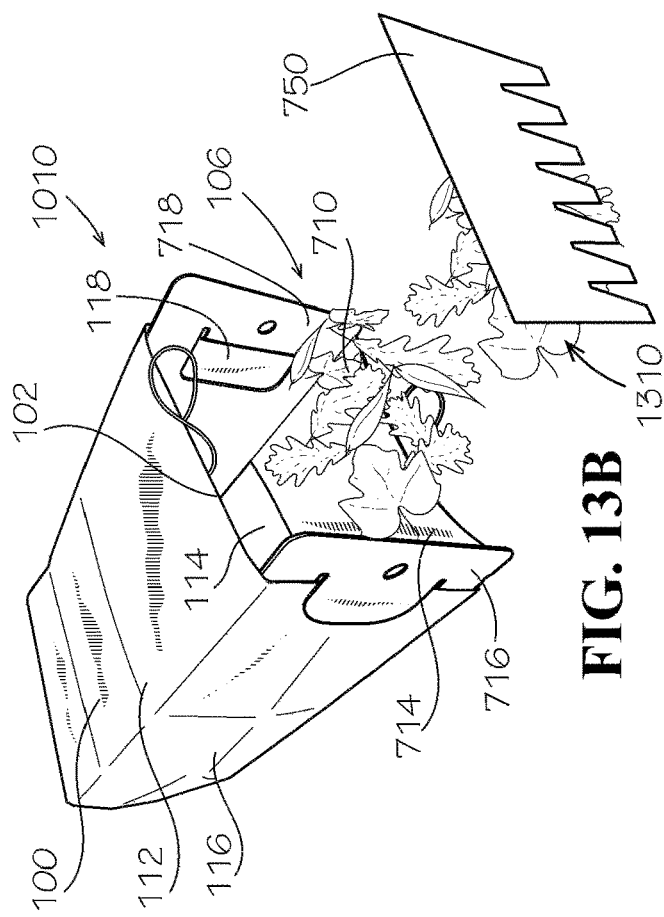
FIG. 13B illustrates the lawn refuse disposal assembly of FIG. 10 in use in a sideways orientation.
Figure 13A:
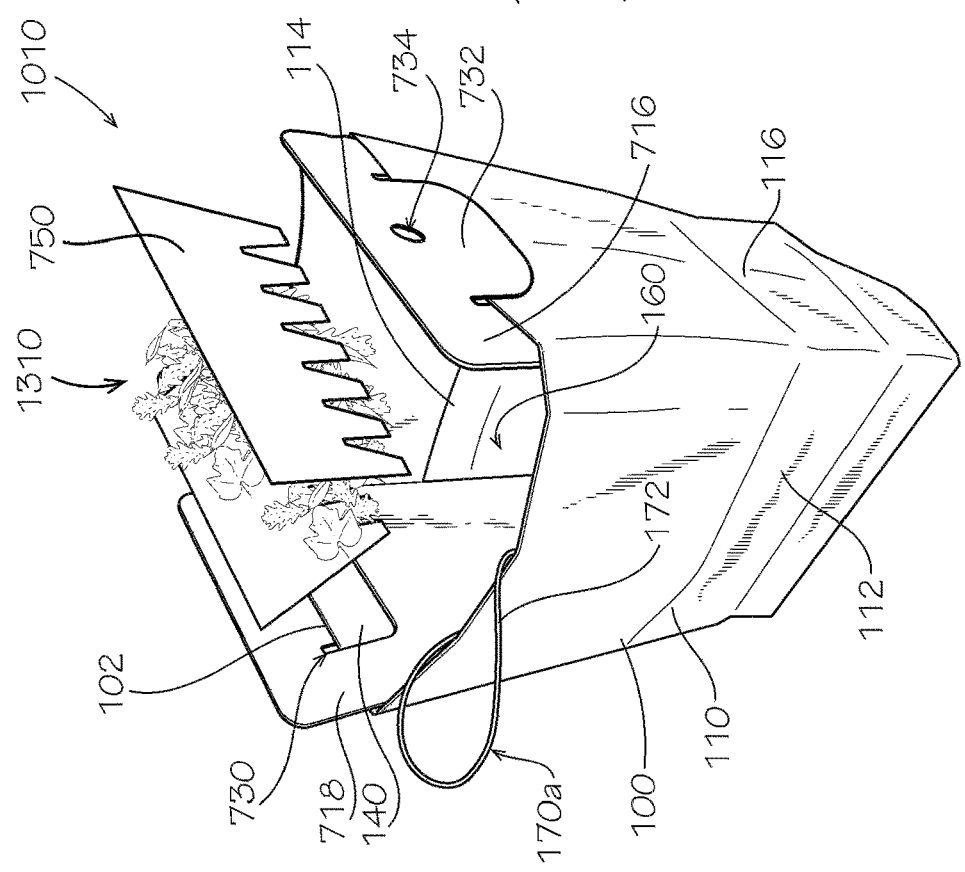
FIG. 13A illustrates the lawn refuse disposal assembly of FIG. 10 in use in an upright orientation.

Once the bag stand 710 and lawn refuse bag 100 are assembled together, a user can fill the lawn refuse bag 100 with lawn refuse, such as grass clippings, dirt, sticks, and leaves 1310, as shown and described in further detail with respect to FIG. 13A. In some aspects, the lawn refuse bag 100 can also or alternatively be filled with other types of refuse, including, trash, biodegradable waste, and the like. When the lawn refuse bag 100 is appropriately filled with lawn refuse, the user can remove the bag stand 710 from the lawn refuse bag 100 and save the bag stand 710 for later use. For example, as shown, each of the finger openings 734 of the bag stand 710 can be oriented above the top end 102 of the lawn refuse bag 100, relative to the orientation shown, when the bag stand 710 is assembled with the lawn refuse bag 100, such that the lawn refuse bag 100 does not interfere with the finger openings 734. To remove the bag stand 710 from the lawn refuse bag 100, a user can engage each of the opposing finger openings 734 with a different hand and lift the bag stand 710 out of the lawn refuse bag 100.

The user can then tie the handle portions 172 of the handle assemblies 170a,170b together such that the lawn refuse bag 100 can be retained in the closed orientation, as shown in FIGS. 5 and 6. The user can then can discard the lawn refuse bag 100 and the lawn refuse together. In other aspects, the user can empty the lawn refuse out of the lawn refuse bag 100 and into another receptacle (e.g., a trash can), such that the lawn refuse bag 100 can also be saved for later use.

As such, in one aspect, a method for using the lawn refuse disposal assembly 1010 can comprising providing a lawn refuse bag insert 700 comprising a bag stand 710 and at least one rake 750, detaching the rake 750 from the bag stand 710, engaging the bag stand 710 with the lawn refuse bag 100, shifting lawn refuse with the rake 750 into the lawn refuse bag 100; disengaging the bag stand 710 from the lawn refuse bag 100; and tying a first one of the handle assemblies 170a of the lawn refuse bag 100 with a second one of the handle assemblies 170b of the lawn refuse bag 100. According to example aspects, the bag stand 710 can comprise an end wall, such as the rear wall 714, and at least one side wall, such as the right wall 716 and/or left wall 718, and engaging the bag stand 710 with the lawn refuse bag 100 can comprise gripping a portion of the lawn refuse bag 100 between the end wall and the corresponding retainer tab 732.

Figure 11:
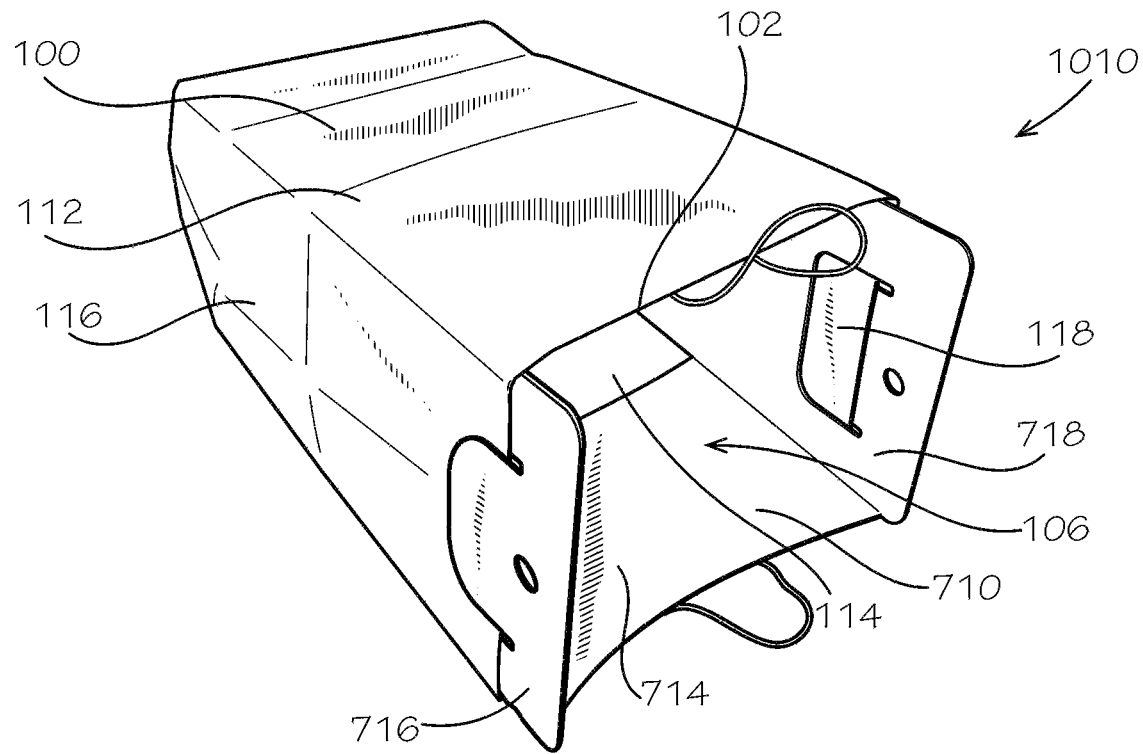
FIG. 11 illustrates the lawn refuse disposal assembly of FIG. 10 in a sideways orientation.

FIG. 11 illustrates the lawn refuse disposal assembly 1010 comprising the bag stand 710 and the lawn refuse bag 100 in a sideways orientation, as opposed to the upright orientation illustrated in FIG. 10. As shown, according to example aspects, in the sideways orientation, the rear sidewall panel 114 of the bag body 110 can be configured to lie on the ground surface (e.g., the lawn, yard, etc.). In other aspects, any of the front sidewall panel 112, right sidewall panel 116, and left sidewall panel 118 can be configured to lie on the ground surface in the sideways orientation. According to example aspects, with the lawn refuse disposal assembly 1010 in the sideways orientation, the rakes 750 can be used to shovel lawn refuse directly into the lawn refuse bag 100 through the top opening 106, which can be oriented proximate to the ground surface, as shown and described in further detail with respect to FIG. 13B. In the present aspect, the bag stand 710 can provide added structure to the lawn refuse bag 100 to prevent the front sidewall panel 112 from collapsing towards the rear sidewall panel 114 and to maintain the top opening 106 in the open orientation.

As shown in FIG. 12, according to various aspects, the refuse bag insert 700 can comprise indicia 1210 printed thereon. In other aspects, the indicia 1210 can be applied to the refuse bag insert 700 by other means, such as, for example, a sticker. In the present aspect, the indicia 1210 can comprise written directions and graphics indicating how to assemble and use the lawn refuse bag 100 (shown in FIG. 1A) and the refuse bag insert 700 (together, the lawn refuse disposal assembly 1010, shown in FIG. 10), as well as the rakes 750. For example, the indicia 1210 on the bag stand 710 can indicate that the lawn refuse bag 100 can be assembled in the unfolded, open, upright orientation, the rakes 750 can be detached from the bag stand 710, and the bag stand 710 can be inserted into the lawn refuse bag 100. The indicia 1210 on the bag stand 710 can also indicate that the lawn refuse disposal assembly 1010 can be used with the lawn refuse bag 100 in the upright orientation, as shown in FIG. 10, and the rakes 750 can be used to lift lawn refuse off the lawn and to dump the lawn refuse into the lawn refuse bag 100 through the top opening 106 (shown in FIG. 1A), as shown in FIG. 13A. The indicia 1210 on the bag stand 710 can further indicate an alternative method of use, wherein the lawn refuse disposal assembly 1010 can be used in the sideways orientation (shown and described with respect to FIG. 11), wherein the rakes 750 can be used to shovel lawn refuse from the lawn into the lawn refuse bag 100 through the top opening 106, as shown in FIG. 13B. According to example aspects, as shown, the indicia 1210 on the rakes 750 can comprise directions for separating the rakes 750 from one other, along with directions for using the rakes 750 to scoop, shovel, or otherwise shift lawn refuse into the lawn refuse bag 100. Other aspects of the indicia 1210 can comprise writing only or graphics only, or can comprise any other suitable forms of indicia in any combination. FIG. 12 also illustrates how the rakes 750 can extend beyond the bottom stand end 722 of the refuse bag insert 700 in some aspects.

Referring to FIG. 13A, in a first aspect, the lawn refuse disposal assembly 1010 can be used with the lawn refuse bag 100 and the refuse bag insert 700 in the upright orientation, and the rakes 750 can be used to lift lawn refuse, such as leaves 1310, off the lawn and to dump the lawn refuse into the interior cavity 160 of the lawn refuse bag 100 from above the lawn refuse disposal assembly 1010. Referring to FIG. 13B, in another aspect, the lawn refuse disposal assembly 1010 can be used in the sideways orientation, wherein the rakes 750 can be used to shovel lawn refuse, such as the leaves 1310, from the lawn into the lawn refuse bag 100 through the top opening 106 thereof.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A lawn refuse bag insert comprising:
   a bag stand defining a top stand end and a bottom stand end, the bag stand comprising an end wall and a first side wall, the first side wall hingedly coupled to the end wall; and
   a first rake detachably coupled to the bag stand;
   wherein the bag stand and the first rake are formed together as a unitary blank; and
   wherein:
      the first sidewall extends from the top stand end to the bottom stand end;
      the end wall extends from the top stand end to an intermediate point between the top stand end and the bottom stand end; and the first rake is oriented between the intermediate point and the bottom stand end.

2. The lawn refuse bag insert of claim 1, wherein the bag stand further comprises a second side wall hingedly coupled to the end wall opposite the first side wall.

3. The lawn refuse bag insert of claim 1, wherein;

the first side wall defines a slot; and the slot defines a retainer tab.

4. The lawn refuse bag insert of claim 3, further defining a finger opening between the retainer tab and the top stand end.

5. The lawn refuse bag insert of claim 1, wherein;

the first side wall defines a tapered section at the bottom stand end; and a width of the first side wall at the bottom stand end is less than a width of the first side wall at the top stand end.

6. The lawn refuse bag insert of claim 1, wherein;

the first rake defines a teeth side and a grip side;

a plurality of teeth extend from the teeth side; and a hand indentation is formed at the grip side.

7. The lawn refuse bag insert of claim 1, further comprising a second rake detachably coupled to the bag stand and detachably coupled to the first rake.

8. The lawn refuse bag insert of claim 1, wherein the unitary blank comprises a corrugated plastic sheet material.

9. The lawn refuse bag insert of claim 1, wherein the first rake is configured to be torn away from the bag stand at a tear line.

10. A lawn refuse bag insert comprising:

a bag stand defining a top stand end and a bottom stand end, the bag stand comprising an end wall and a first side wall, the first side wall hingedly coupled to the end wall;

a first rake detachably coupled to the bag stand; and a second rake detachably coupled to the bag stand and detachably coupled to the first rake.

11. A lawn refuse bag insert comprising:

a bag stand defining a top stand end and a bottom stand end, the bag stand comprising an end wall and a first side wall, the first side wall hingedly coupled to the end wall; and a first rake detachably coupled to the bag stand;

wherein:

the first sidewall extends from the top stand end to the bottom stand end;

the end wall extends from the top stand end to an intermediate point between the top stand end and the bottom stand end; and the first rake is oriented between the intermediate point and the bottom stand end.

12. A lawn refuse bag insert comprising:

a bag stand defining a top stand end and a bottom stand end, the bag stand comprising an end wall and a first side wall, the first side wall hingedly coupled to the end wall;

a first rake detachably coupled to the bag stand; and a second rake detachably coupled to the bag stand and detachably coupled to the first rake;

wherein the bag stand and the first rake are formed together as a unitary blank.

* * * * *